March 13, 1962 M. CAMRAS 3,025,011

SINGLE SPOOL MAGAZINE TAPE RECORDER

Filed March 23, 1959 10 Sheets-Sheet 1

Inventor
MARVIN CAMRAS by Hill, Sherman, Meroni, Gross & Simpson Attys.

Inventor
MARVIN CAMRAS
by Hill, Sherman, Meroni, Gross & Simpson Attys.

March 13, 1962 M. CAMRAS 3,025,011

SINGLE SPOOL MAGAZINE TAPE RECORDER

Filed March 23, 1959 10 Sheets-Sheet 3

Inventor
Marvin Camras by Hill, Sherman, Meroni, Gross & Simpson Attys.

*INVENTOR.*
MARVIN CAMRAS
*BY*
Hill, Sherman, Meroni, Gross & Simpson
ATTORNEYS

*INVENTOR.*
MARVIN CAMRAS
*BY*
Hill, Sherman, Meroni, Gross & Simpson
ATTORNEYS

March 13, 1962 M. CAMRAS 3,025,011

SINGLE SPOOL MAGAZINE TAPE RECORDER

Filed March 23, 1959 10 Sheets-Sheet 6

INVENTOR.
MARVIN CAMRAS
BY
Hill, Sherman, Meroni, Gross & Simpson
ATTORNEYS

March 13, 1962 M. CAMRAS 3,025,011

SINGLE SPOOL MAGAZINE TAPE RECORDER

Filed March 23, 1959 10 Sheets-Sheet 7

INVENTOR.
MARVIN CAMRAS

BY

Hill, Sherman, Meroni, Gross & Simpson

ATTORNEYS

March 13, 1962 M. CAMRAS 3,025,011

SINGLE SPOOL MAGAZINE TAPE RECORDER

Filed March 23, 1959 10 Sheets-Sheet 8

INVENTOR.
MARVIN CAMRAS
BY
Hill, Sherman, Meroni, Gross & Simpson
ATTORNEYS

INVENTOR.
MARVIN CAMRAS
BY Hill, Sherman, Meroni, Gross & Simpson
ATTORNEYS

INVENTOR.
MARVIN CAMRAS
BY
Hill, Sherman, Meroni, Gross & Simpson
ATTORNEYS

3,025,011
SINGLE SPOOL MAGAZINE TAPE RECORDER
Marvin Camras, Glencoe, Ill., assignor to Armour Research Foundation of Illinois Institute of Technology, Chicago, Ill., a corporation of Illinois
Filed Mar. 23, 1959, Ser. No. 801,403
31 Claims. (Cl. 242—55.13)

The present invention is directed to an improved magnetic or electrostatic recording or reproducing apparatus and particularly to a magnetic or electrostatic sound reproducing apparatus employing an improved type of spool magazine structure.

There have been some commercial embodiments of magnetic recording and reproducing apparatus both of the wire and tape type which employed magazine units. In one form of such machines, however, the magazine contained two spools which were arranged to be received on spindles permanently associated with the reproducing machine. Magazine units of this type were necessarily bulky and costly.

Still another type of magazine previously suggested contained a tape record in the form of an endless band. This type has advantages from the standpoint of ability to repeat short recordings. Among its disadvantages are the fact that the record must be run through entirely to return to the beginning of the record, i.e., it cannot be reversed, records of any considerable length are likely to bind and jam the supply system, and the record had to be hand threaded or else the magazine had to be provided with costly and unreliable parts.

Neither of these types provided a magazine which was protected against dust or accidental mishandling. Furthermore, each required a special playback machine.

The apparatus of the present invention makes use of a highly compact, inexpensive magazine arranged to provide a threading feature for completely automatic operation. This type of magazine lends itself very readily to the use of pre-recorded record members which can be inserted manually or automatically into the reproducing machine without threading.

An object of the present invention is to provide an improved magnetic or electrostatic sound assembly adapted for operation with the above magazine.

Still another object of the invention is to provide an improved magnetic or electrostatic sound assembly employing a magazine of unique construction which protects the record against dust and accidental mishandling.

Another object of the invention is to provide an improved magazine particularly adapted for use with prerecorded magnetic or electrostatic record members.

Another object of the invention is to provide a magazine which can be used on a variety of machines, including manual threading, semi-automatic or fully automatic, so that present day recorders are not rendered obsolete.

Other objects and features of the present invention will be apparent from the following description of the attached sheets of drawings which illustrate a magnetic sound assembly embodying the principles of the present invention.

Figure 1:
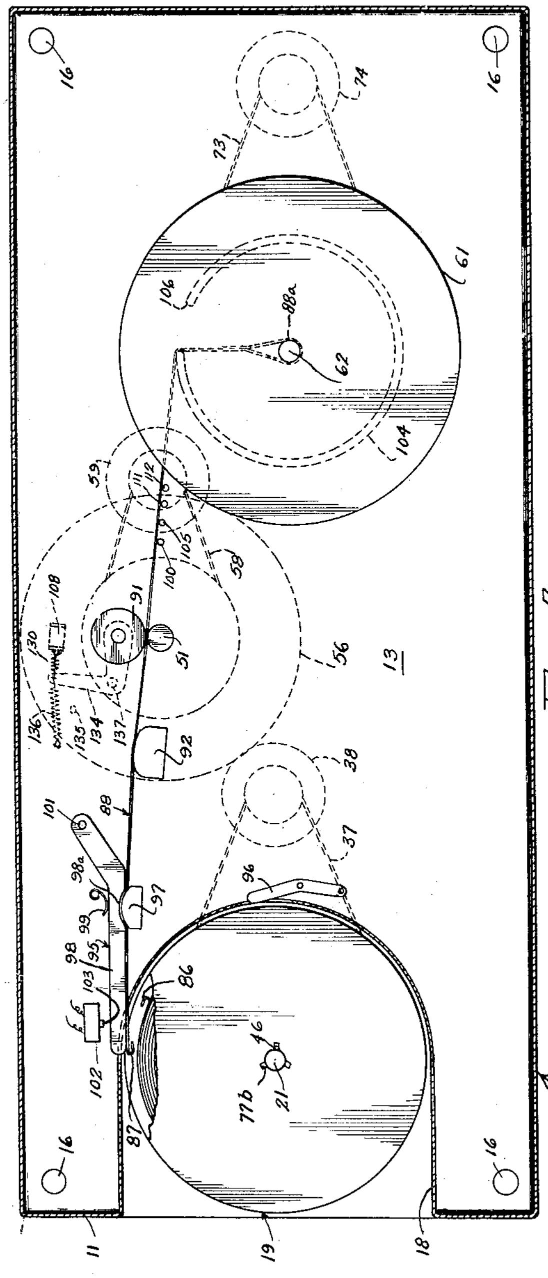
FIGURE 1 is a plan view, partly in cross section, illustrating the magazine, take-up reel, and capstan structure of a first embodiment of the present invention.
Figure 8:
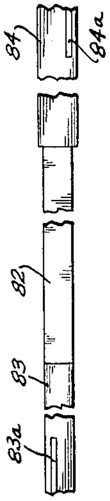
Figure 7:
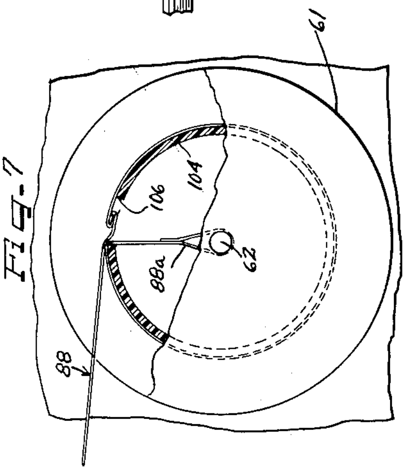
Figure 6:
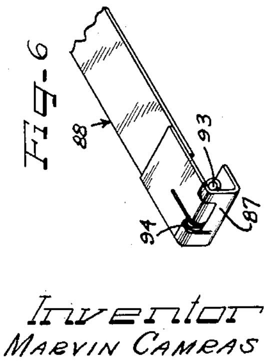
Figures 2, 2A, 3, 4, 5:
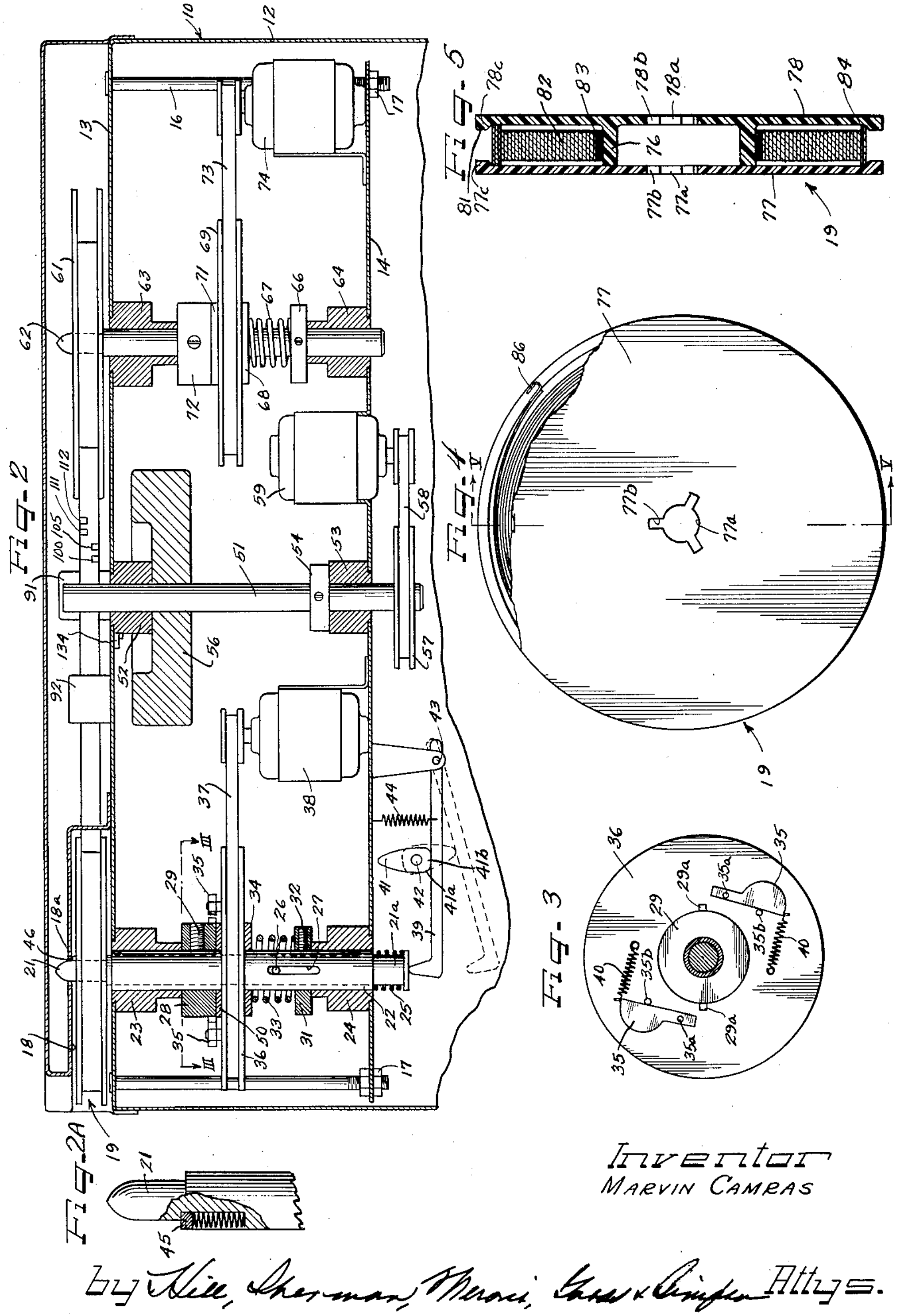
FIGURE 2 is a view in elevation and partly in cross-section of the structure shown in FIGURE 1.
Figure 9:
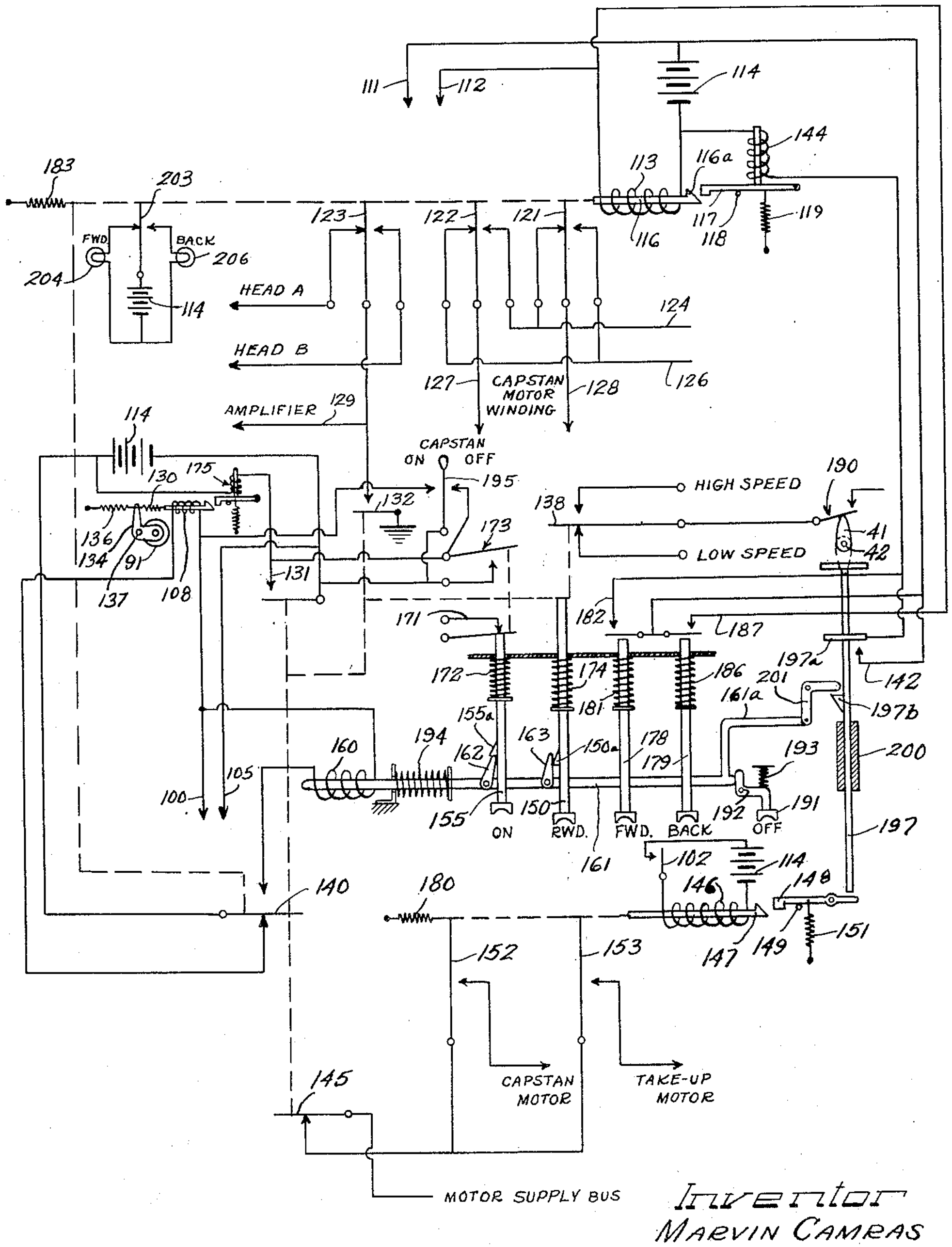
Figure 10:
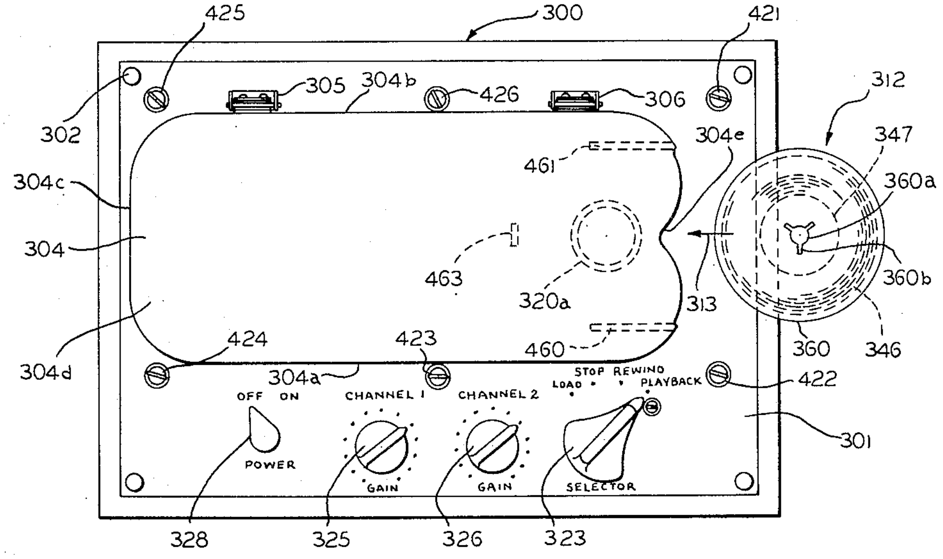
Figure 11:
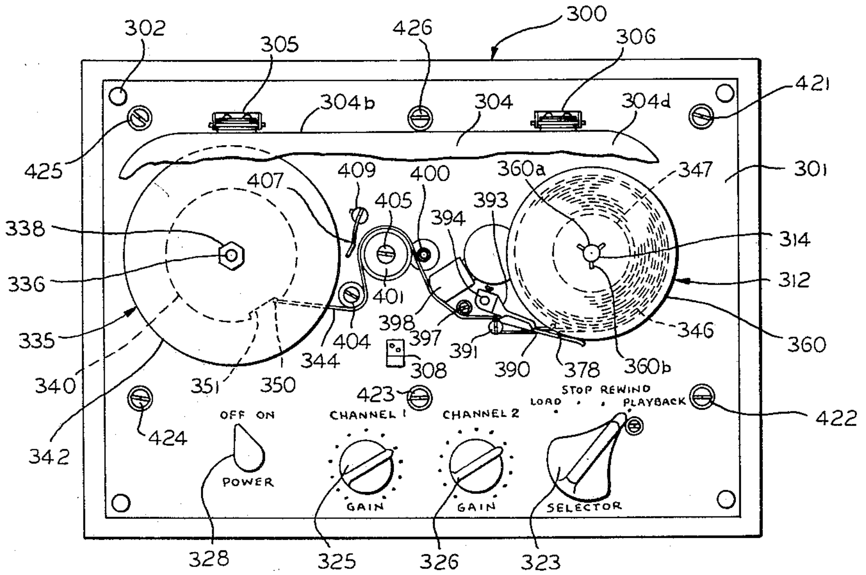
Figure 12:
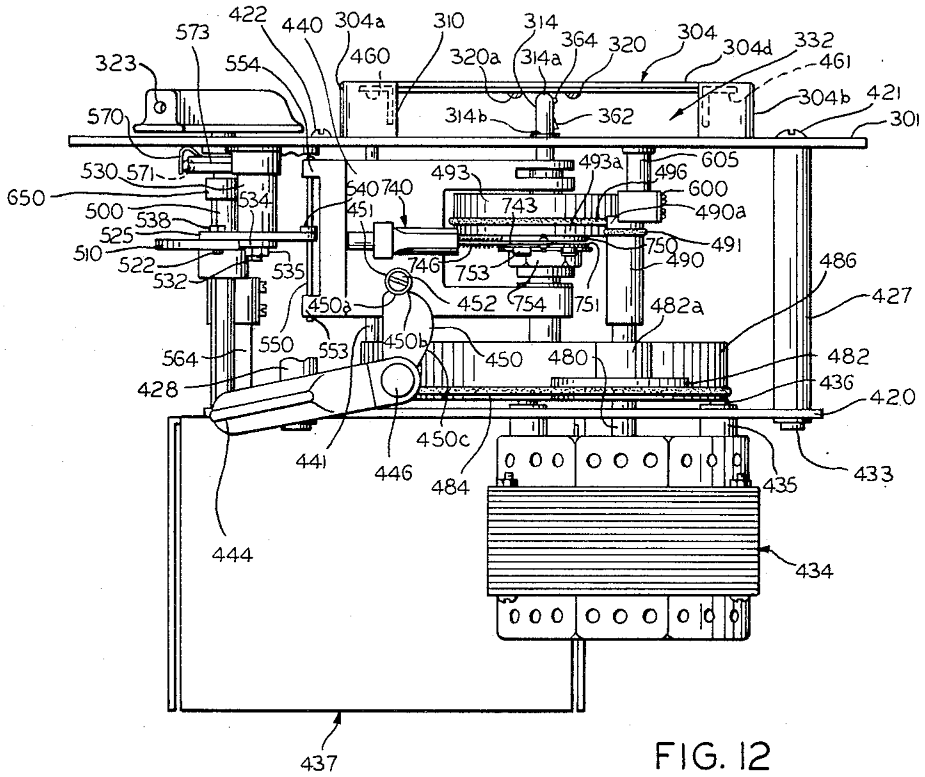
Figure 13:
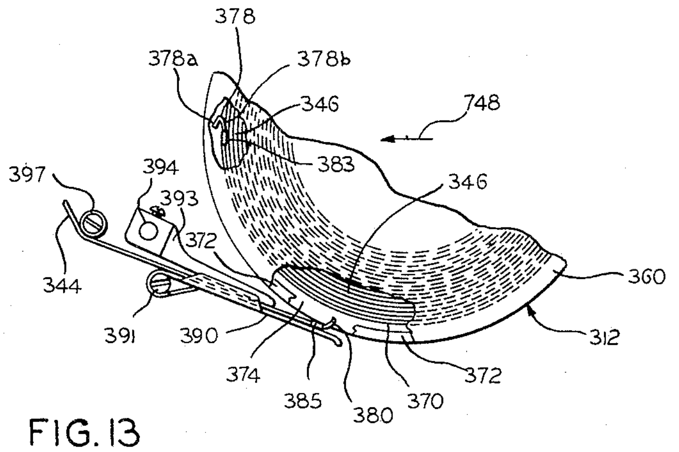
Figure 14:
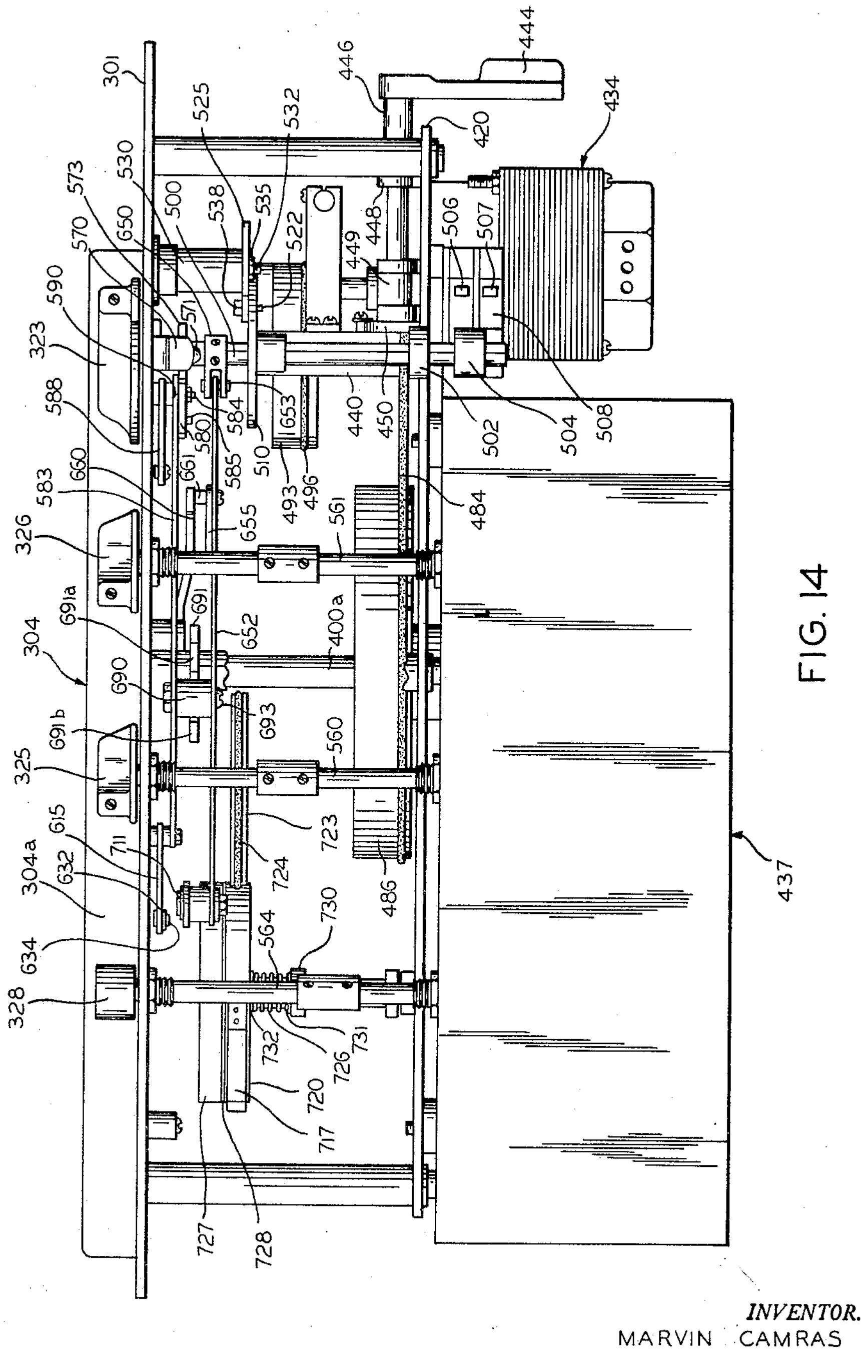
Figure 15:
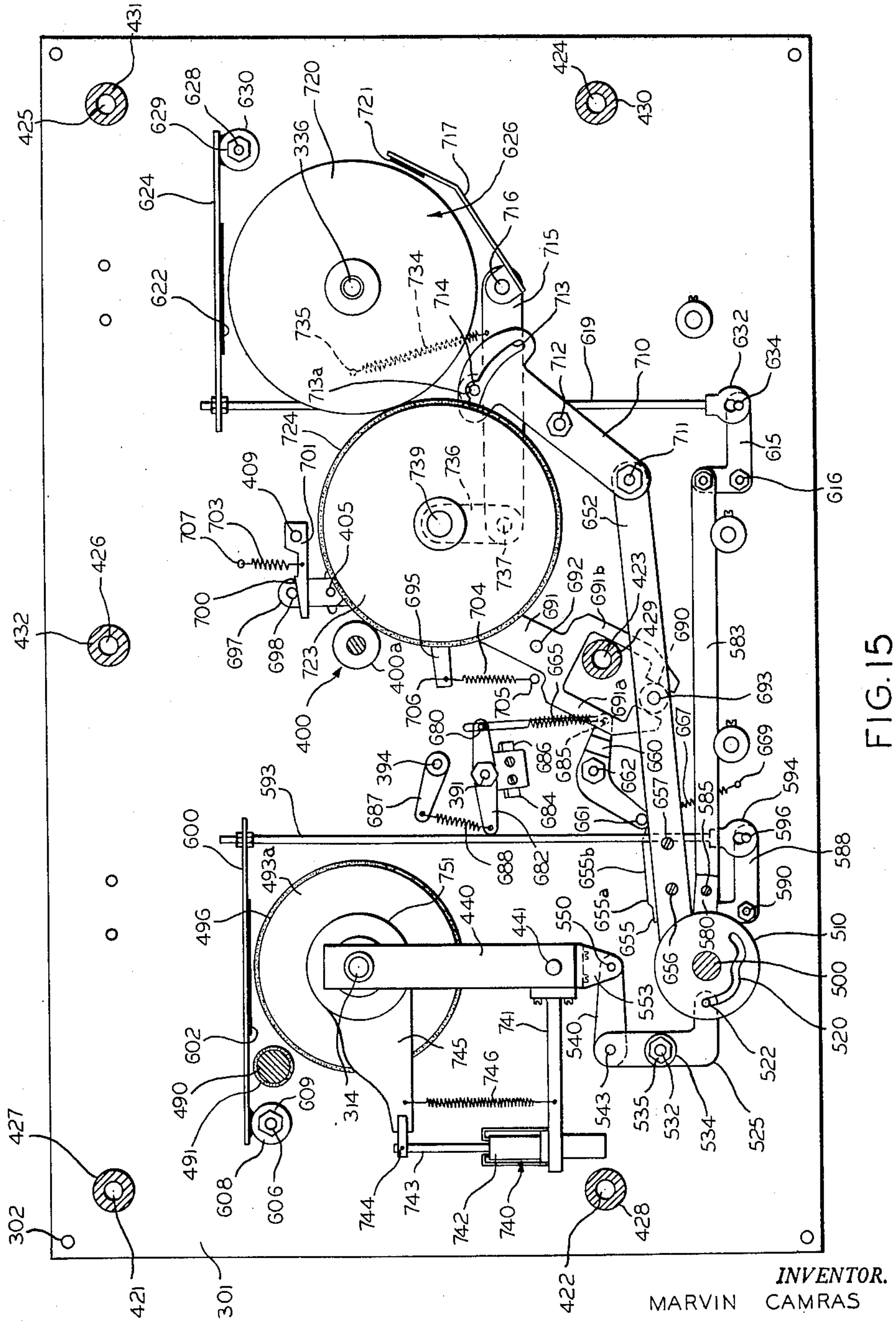
Figures 16, 17, 18, 19:
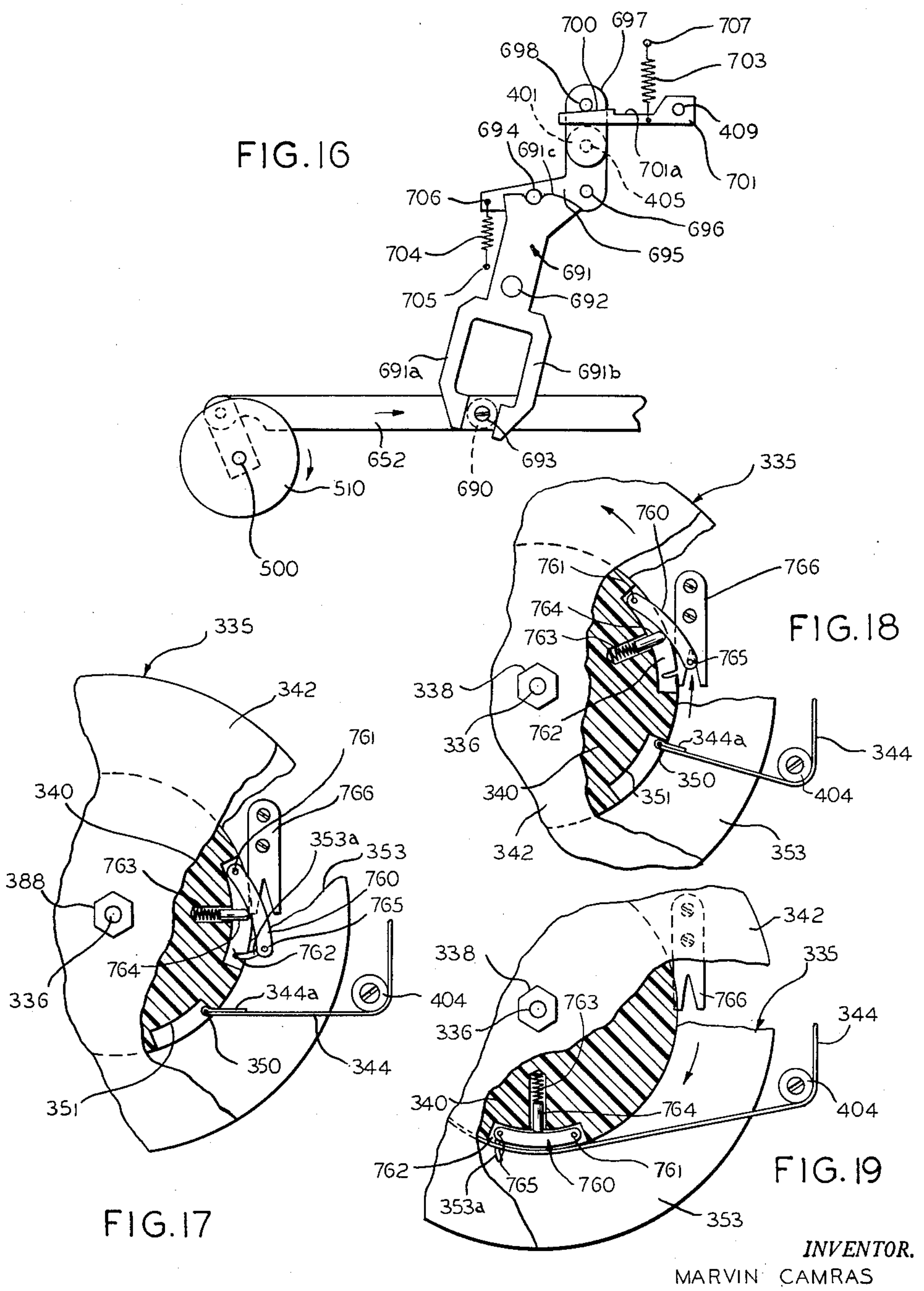
Figure 20:
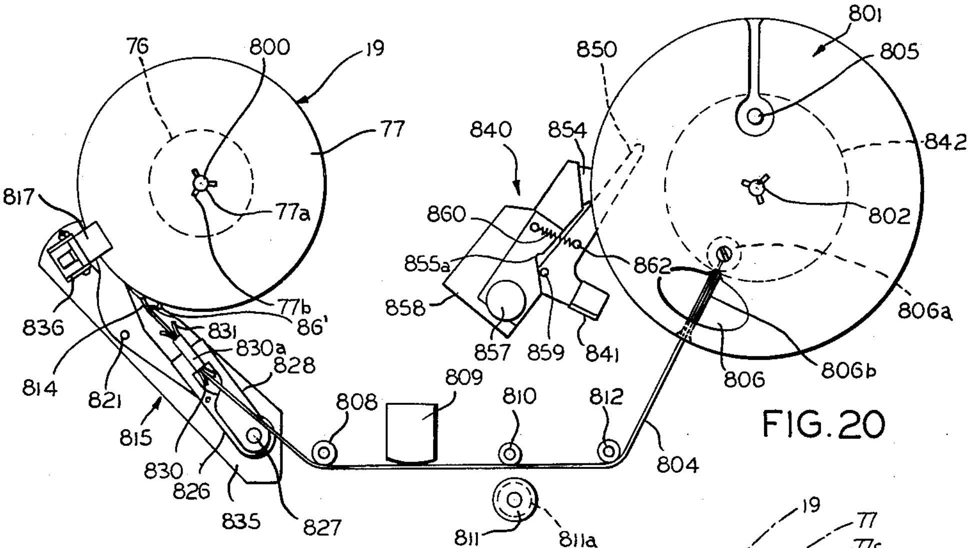
Figure 21:
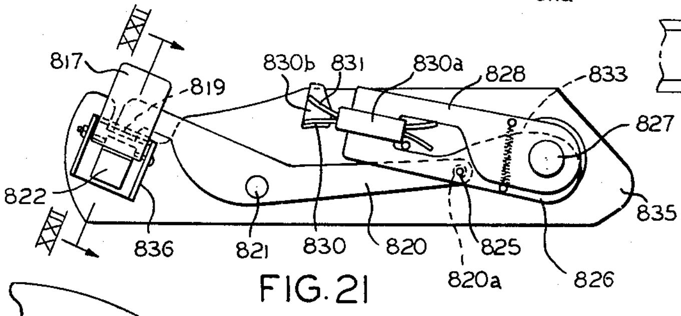
Figure 22:
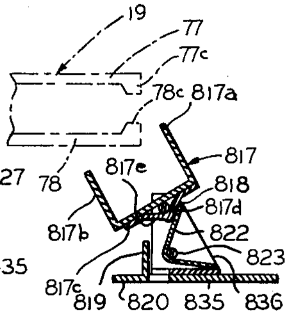
Figure 24:
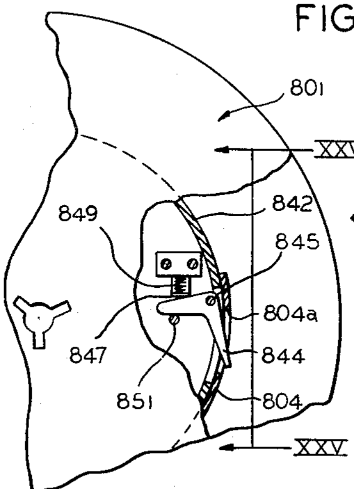
Figure 25:
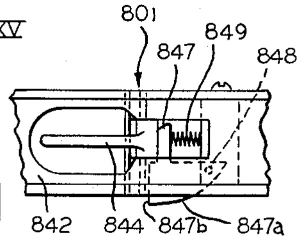
Figure 23:
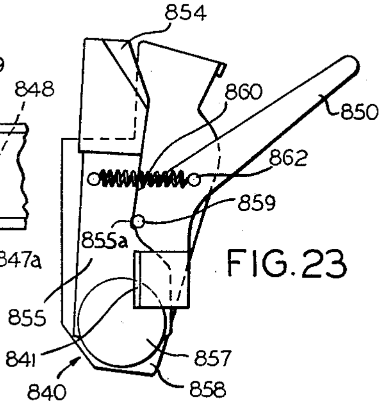
Figure 27:
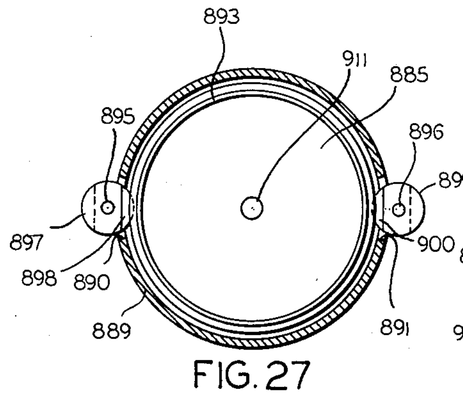
Figure 26:
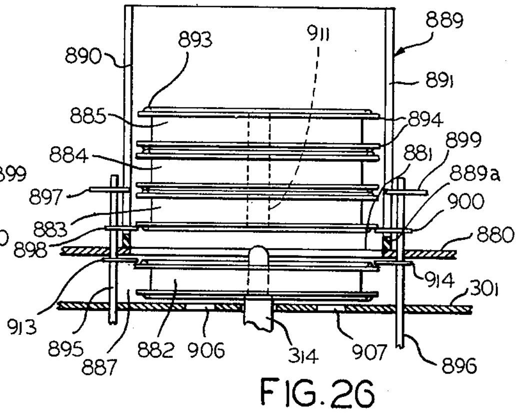
Figures 28, 31, 32:
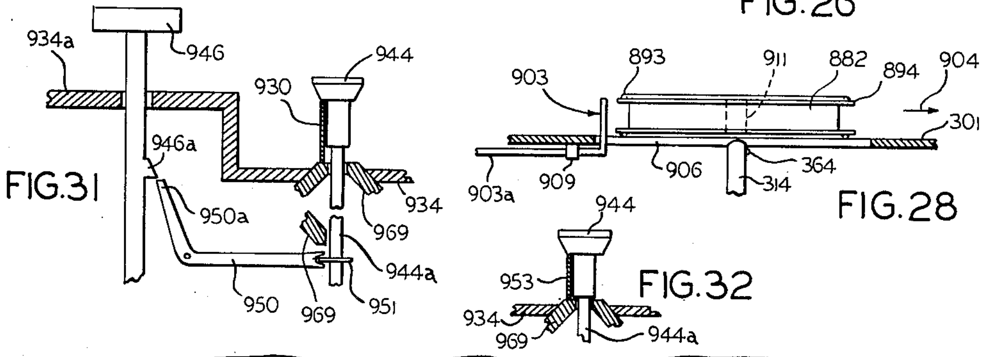
Figures 29, 30:
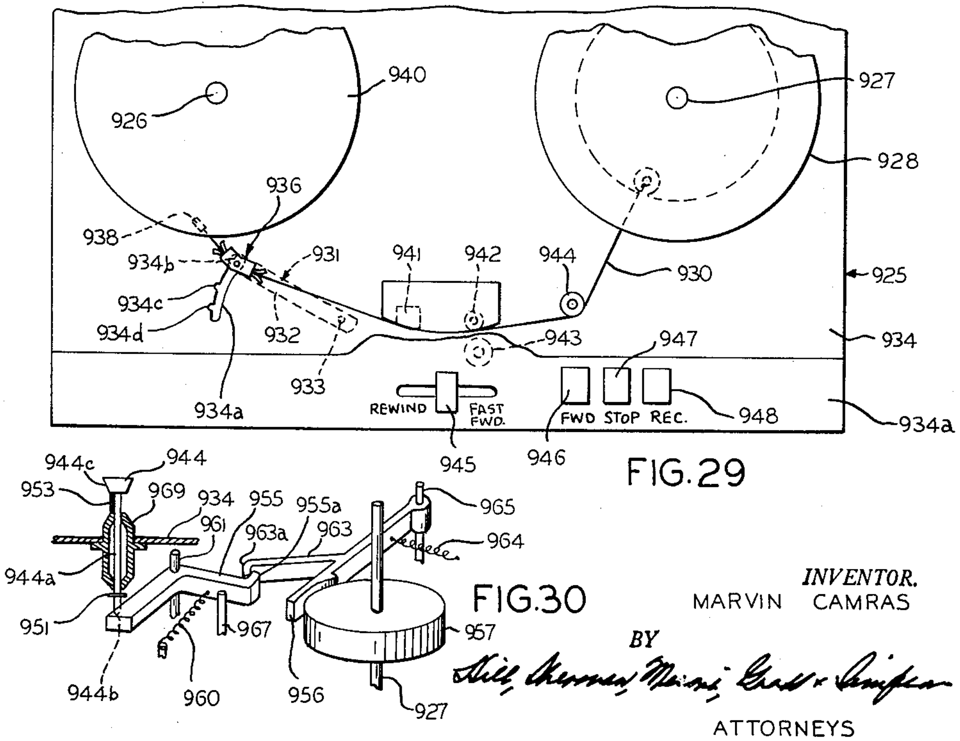

FIGURE 2*a* is an enlarged fragmentary view of the spindle assembly;

FIGURE 3 is a view along the line III—III of FIGURE 2;

FIGURE 4 is a plan view, partly broken away, of the magazine structure;

FIGURE 5 is a cross-sectional view taken substantially along the lines IV—IV of FIGURE 4;

FIGURE 6 is a view in perspective of the detachable coupling means employed in conjunction with the threading member;

FIGURE 7 is a fragmentary view of the take-up reel illustrating the manner in which the threading member is received within the takeup reel;

FIGURE 8 is a fragmentary view of the tape and its leaders;

FIGURE 9 is a circuit diagram illustrating the various control circuits employed in the apparatus illustrated in FIGURES 1 through 8 of the drawings;

FIGURE 10 is a top plan view of a second embodiment of a single spool magazine tape playback machine in accordance with the present invention;

FIGURE 11 is a top plan view similar to FIGURE 10 but showing the cover broken away to expose a portion of the mechanism;

FIGURE 12 is a somewhat diagrammatic right end elevational view of the machine of FIGURE 1 with the casing of the machine omitted;

FIGURE 13 is a fragmentary enlarged top plan view illustrating the manner in which the threading leader is engaged with the outer leader on the tape supply magazine;

FIGURE 14 is a somewhat diagrammatic front elevational view of the machine of FIGURE 10;

FIGURE 15 is a fragmentary enlarged somewhat diagrammatic plan view illustrating the condition of certain parts of the machine with the manual selector switch in "playback" position;

FIGURE 16 is a somewhat diagrammatic fragmentary bottom plan view illustrating the linkage arrangement for cocking the control for the capstan pressure roller;

FIGURE 17 is a fragmentary somewhat diagrammatic top plan view illustrating certain details of the take-up reel assembly;

FIGURE 18 is a view similar to FIGURE 17 but showing the take-up reel assembly in its initial position, which is the position assumed by the assembly upon complete rewind of the tape onto the magazine, the threading leader having its free end disposed in threading position;

FIGURE 19 is a view similar to FIGURES 17 and 18 but illustrating the condition of the take-up reel as the threading leader is wound onto the reel;

FIGURE 20 is a somewhat diagrammatic plan view illustrating a further embodiment of the present invention and illustrating components which are adapted to be applied to existing magnetic tape recording machines to convert the machines to semi-automatic threading of the tape from a single spool magazine;

FIGURE 21 is a somewhat diagrammatic enlarged plan view of one of the components of the embodiment of FIGURE 20;

FIGURE 22 is a vertical cross sectional view taken generally along the line XII—XXII of FIGURE 21;

FIGURE 23 is a somewhat diagrammatic enlarged plan view of the braking assembly of the embodiment of FIGURE 20;

FIGURE 24 is an enlarged fragmentary plan view illustrating certain details of the take-up reel assembly of the embodiment of FIGURE 20;

FIGURE 25 is a fragmentary somewhat diagrammatic elevational view taken generally as indicated by the line XXV—XXV of FIGURE 24;

FIGURE 26 is a somewhat diagrammatic vertical sectional view illustrating an automatic single spool magazine changer assembly which may be applied to the embodiment of FIGURES 10 through 19, for example;

FIGURE 27 is a horizontal sectional view of the mechanism of FIGURE 26;

FIGURE 28 is a somewhat diagrammatic fragmentary vertical sectional view taken generally at right angles to FIGURE 26 and illustrating the magazine adjusting mechanism for the changer mechanism of FIGURE 26;

FIGURE 29 is a somewhat diagrammatic top plan view of a further embodiment of the present invention and illustrating the general way in which existing machines may be revised for semi-automatic threading of single spool magazines;

FIGURE 30 is a somewhat diagrammatic perspective view illustrating certain component parts of the embodiment of FIGURE 29 and illustrating the manner in which the take-up reel may be automatically braked during rewind of the tape onto the supply spool;

FIGURE 31 is a somewhat diagrammatic fragmentary vertical sectional view illustrating certain further components of the mechanism of the embodiment of FIGURE 29; and FIGURE 32 is a fragmentary vertical sectional view illustrating a different position of one of the controls of FIGURE 31.

As shown on the drawings:

In FIGURE 1, reference numeral 10 indicates generally a casing for supporting the various elements constituting the drive mechanism of a magnetic reproducer or a combined magnetic recording and reproducing machine. As best seen in FIGURE 2, the casing 10 includes opposed side walls 11 and 12 and a partition wall 13. A base support 14 is suspended from the partition wall 13 by means of support bolts 16 and nuts 17.

As best indicated in FIGURE 2, a portion of the casing 10 is recessed to provide a magazine receiving well 18 into which a tape magazine, generally indicated at numeral 19, may be inserted. The upper wall of the magazine well 18 is provided with an aperture **18*a* through which the free end of a spindle 21 is received when the magazine 19 is locked for rotation within the magazine well 18**.

The spindle 21 is received within a sleeve 22 supported between opposed bearings 23 and 24. Axial movement of the spindle 21 in the sleeve is limited by providing a pin 26 secured to the spindle and extending into a slot 27 in the sleeve 22. The pin 26 and slot 27 cooperate to permit retraction of the spindle 21 within the sleeve 22 while preventing relative rotative movement between the spindle 21 and the sleeve 22.

An upper collar 28 is secured to the sleeve 22 by means of a set screw 29, and a lower collar 31 is secured to the sleeve 22 by means of a set screw 32. Between the collars 28 and 31, a spring 33 urges a metal washer 34 upwardly against a floating pulley 36 which rotates freely about the sleeve 22. A slipping clutch is provided for driving the spindle 21 by the inclusion of a felt pad 50 between the collar 28 and the upper surface of the pulley 36.

A positive drive for the rewind condition may be provided through the use of a centrifugal clutch assembly of the type best shown in FIGURE 3. As shown, a pair of opposed pivotal weights 35 are supported for pivotal movement on the pulley 36 at a pair of pins **35*a*. At low speeds, a pair of springs 40 are strong enough to hold the weights 35 against a pair of stops 35*b*. At high speeds, however, the centrifugal force acting on the weights 35 causes them to overcome the spring tension and pivot on the pins 35*a*. Eventually, the inner ends of the weights 35 will engage lugs 29*a* formed on the collar 29** to provide a driving connection in the rewind direction.

The pulley 36 is driven by means of a belt 37 from a two-speed motor 38. For purposes of convenience, the drive system of the embodiment herein described consists of three motors, but it will be obvious that a single motor with appropriate power transmitting elements can be substituted for the drive unit shown herein.

Spindle 21 has a lower end portion **21*a* extending below the level of the sleeve 22 as best shown in FIGURE 2. A spring 25 acts against the end portion 21*a* to urge it into engagement with a lever 39 whose position is controlled by a cam 41 arranged to pivot about a shaft 42. The lever 39 is arranged to pivot about a pin 43, and a spring 44 urges the lever 39 against the camming surfaces of the cam 41**.

Camshaft 42 is operated by a pushbutton or selector from the control panel. In addition to its mechanical function it is linked to switches that control the operating sequence, as will be described. Alternatively, the act of inserting the magazine may be used to initiate operation of the camshaft, so as to eliminate the pushbutton. For example, the magazine can trigger a spring to operate the cam, the spring having been pre-set during the prior operating cycle; or an electrical actuator can perform the cycling.

In the position of the cam 41 shown in FIGURE 2 of the drawings, the spindle 21 is arranged to drive the magnetic record member in the magazine 19 in the normal running position. To load the machine, the lever 39 is moved to the retracted position illustrated by dash lines in FIGURE 2 by means of cam 41. The spindle 21 is thus set for loading, with the upper end of the spindle 21 being retracted below the level of the partition wall 13. After a magazine 19 is inserted into the well 18, the cam 41 is rotated from the position indicated by dash lines in FIGURE 2 for example in a clockwise direction to a position in which the spindle 21 is forced upwardly into the central aperture in magazine 19 with a detent 46 on the spindle pushing the entire magazine 19 upwardly against the roof of the magazine well 18. Continued rotation of cam 41 in the clockwise direction as seen in FIGURE 2 causes further upward movement of the spindle 21 and causes the detent 46 on spindle 21 to pass through the central aperture of the magazine 19. When the cam 41 is rotated further in the clockwise direction to the operating position illustrated in FIGURE 2 in solid lines, the spindle 21 is retracted slightly and the detent 46 locates the magazine 19 in proper alignment and clearance within the magazine well 18. Positive drive from spindle 21 is assured by a spring biased drive tongue 45 (FIGURE 2*a*) which engages one of the radial slots **77*b* of the magazine shown in FIGURE 4. The face 41*a* of cam 41 is, of course, at a lesser radial distance from the center of rotation at 42 than face 41*b* thereof to produce the retraction of spindle 21** to operating position.

A capstan shaft 51 is mounted between opposed bearings 52 and 53 and has a collar 54 fastened thereto which rests on the bearing 53. A flywheel 56 is secured to the capstan shaft 51 to act as a rotary stabilizer. Capstan shaft 51 is driven by means of a pulley 57 and a belt 58 from a capstan drive motor 59. The motor 59 is of the reversible type as will appear more fully from the succeeding portion of the specification.

The take-up reel assembly includes a take-up reel 61 keyed for rotation with a spindle 62. The spindle 62 is received between opposed bearings 63 and 64 and has a collar 66 fastened thereto resting on the upper end of the bearing 64. A spring 67 is positioned between the collar 66 and a washer 68. A free riding pulley 69 is received between the washer 68 and felt pad 71 which provides a slipping clutch for the take-up reel 61. A collar 72 is secured to the spindle 62 and holds the felt pad 71 against the upper surface of the pulley 69. A belt 73 drives the take-up reel from a motor 74.

The structure of the single spool magazine is best illustrated in FIGURES 4 and 5 of the drawings. As seen in these two figures, the magazine 19 includes a central hub 76 and opposed annular flange members 77 and 78.

The annular flange members 77 and 78 have centrally disposed apertures 77a and 78a in registry, together with radial slots 77b and 78b in the normal arrangement for magnetic tape reels. The spool dimensions are such as to permit the use of the spool on present day machines of the home recorder type.

The annular flange members 77 and 78, at their outer peripheries, have axially extending confronting end portions 77c and 78c which define a slot 81 for the passage of tape 82 trained around the hub 76. As best illustrated in FIGURE 5 of the drawings, the width of the tape 82 is less than the width of the hub 76 and is less than the width of the slot 81 so that it may be freely received through the slot 81 as it is unwound from the hub 76.

The inner end of the tape 82 is secured by means of an inner leader 83 to the hub 76 in any convenient manner. As indicated, the width of the leader 83 is substantially the same as the width of the tape 82 so that it may be freely received through the slot 81.

An outer leader 84 has its inner end secured to the outer free end of the tape 82. The leader 84 is preferably composed of a reasonably stiff but flexible material such as a fabric impregnated with cellulose resin or other synthetic resin. As indicated in FIGURE 5, the width of the outer leader 84 is greater than the width of the slot 81 and the outer leader 84 is received behind the confronting peripheral end portions 77c and 78c. With this arrangement, when the outer leader 84 is wrapped around the tape 82 with one or more complete turns, the outer leader 84 serves very effectively as a dust and moisture cover as well as a mechanical shield to protect the tape 82. Its self-retaining feature allows handling the magazine without loosening or unwinding. The leader 84 nevertheless is still sufficiently flexible so that it may be bent slightly and pulled through the slot 81 to start unreeling of the magnetic tape.

The outer free end of the leader 84 is provided with a hook 86, FIGURES 1 and 4, by means of which the threading operation is initiated, as will be apparent from the succeeding description. The hook 86 may be composed of metal, but may just as readily be composed of a suitable synthetic resinous material.

The hook 86 is arranged to cooperate with a hook 87 to form a detachable coupling between the leader 84 and a threading member generally indicated by numeral 88 in the drawings. As best seen in FIGURE 1, the opposite end of the threading member 88 is anchored by means of a loop 88a to the spindle 62 of the take-up reel 61. The threading member 88 follows the normal path for the tape through the assembly, passing between the capstan shaft 51 and a pivoted capstan roller 91, past an electromagnetic head 92 and through a tension sensitive mechanism generally indicated at numeral 95 in the drawings.

The threading member 88 is preferably composed of a flexible, but relatively strong material such as a plastic impregnated canvas. The hook 87 is secured to the threading member 88 by means of a hinge including a pin 93 and a coiled spring 94 which normally urges the hook portion 87 inwardly toward the position indicated in FIGURE 6 of the drawings.

When the magazine 19 is introduced into the magazine receiving well 18 and properly secured on the spindle 21, the motor 38 is energized through a switch 190, FIGURE 9, which is actuated when the cam 41 is in the "operate" position shown in FIGURE 2. The motor turns at a relatively slow speed such that shaft 21 revolves counterclockwise on the order of sixty or one hundred twenty revolutions per minute. As the motor 38 rotates slowly, the magazine 19 is also rotated at a slow rate of speed for one revolution or less until such time as the hook 86 on the magazine assembly engages the hook 87 on the threading member 88. As this occurs, the tension created by the engagement of the two hook portions energizes the tension sensing device 95. The latter consists of a generally arcurate surfaced guide member 97 which cooperates with a switch actuating arm 98 having an arcuate portion 98a generally complementary to the shape of the arcuately shaped surface of the guide member 97. With no tension applied to the threading member 88, a relatively light spring 99 urges the arm 98 against the threading member 88, causing it to conform to the arcuate configuration of the slot defined between the arcuate portion 98a and the guide member 97. When, however, a tension is applied by the engagement of the hooks 86 and 87, the arm 98 is pivoted about its pivot pin 101 and serves to operate a switch 102 having an operating button 103 to start the take-up motor 74, and the capstan drive motor 59 by the operation of a latch relay 147, FIGURE 9.

As the two motors are energized, the outer leader 84 and then the tape 82 are pulled through the slot 81, the clutch on the take-up reel 61 being strong enough to overcome that of magazine 19, past the head 92, between the capstan shaft 51 and the capstan roller 91 and finally received onto the take-up reel 61.

After the hooks 86, 87 have passed between the capstan 51 and capstan roll 91, which are in open position, a pair of contacts 100 and 105 are bridged by a metal coating 84a near the lower edge of the outer tape leader 84, thus energizing a solenoid 108 which closes and latches capstan roller 91 in the tape driving position, as explained more fully hereafter. The take-up reel 61 has a relatively large diameter hub 104 whose outer periphery is just great enough to take the length of the threading member 88, as best illustrated in FIGURE 7 of the drawings. Thus, when the take-up reel 61 has made one revolution, the engaged hooks 86 and 87 are received within a slot 106 formed in the hub 104 so that the engaged hooks do not provide a protuberance which might interfere with the winding of the tape onto the take-up reel 61. The contour of the receiving slot and the shape of the hook assembly should be such as to provide a smooth bump-free base for subsequent winding.

In normal running operation, the capstan roller 91 is urged against the tape by the action of the solenoid 108 acting through a spring 130 to urge the roller 91 resiliently against the tape. The machine then functions for normal playback or recording with the capstan 51 providing the positive driving action for drawing the magnetic tape across the electromagnetic head 92. At this time, the clutch on the magazine 19 is still being driven in a counterclockwise direction as viewed in FIGURE 1 at a slow rate of speed to provide a slight amount of tension on the magnetic record member. Similarly, the take-up motor 74 is driven at a slow rate of speed in a clockwise direction to provide tension in winding up the magnetic record member on the take-up reel 61.

The machine illustrated has also been provided with circuit means for playing the tape in the reverse direction, that is, reproducing the intelligence on a second channel of the tape, and also for a high speed rewind operation. These circuit means are best illustrated in FIGURE 9 of the drawings.

After the tape has been played in the forward direction, that is, moving from left to right as viewed in FIGURE 1, the mechanism is automatically reversed by providing a pair of spaced contacts 111 and 112 which cooperate with a thin film of metallic paint 83a appearing near the upper edge on the inner leader 83. When the contacts 111 and 112 are bridged by the metallic paint film 83a, a solenoid 113 is energized from a source 114 of direct current as schematically illustrated in FIGURE 9 of the drawings. This direct current source 114 and the other direct current sources have been indicated as batteries, merely for convenience, since normally such direct current sources will be tapped off from a suitable portion of the power supply feeding the amplifier. As the circuit to the solenoid 113 is closed, an armature 116 having a latch portion 116a engages a locking arm 117 and is thereby held in the energized position. The arm 117 normally rests against a stop 118 and is urged thereagainst by the action of a spring 119.

When the solenoid 113 is energized and the armature 116 moves into locked engagement with the arm 117, the movement of the armature 116 shifts the position of five contact arms identified at 121, 122, 123, 140 and 203 in the drawings. Contact arms 121 and 122 are part of a double throw, double pole reversing switch which selectively feeds an energizing voltage from leads 124 and 126 to a winding of the capstan motor 59 through a pair of leads 127 and 128. In this way, the direction of rotation of the capstan motor is reversed and the capstan shaft 51 drives the tape in a right to left direction as viewed in FIGURE 1. The direction of movement for which the machine is set is indicated by the operation of the arm 203, which operates between a pair of contacts to selectively energize a pair of indicator lights 204 and 206.

The contact arm 123 selectively connects the output of either of two heads, head "A" or head "B," of the electromagnetic head 92 to the amplifier through a lead 129. The heads "A" and "B" are in offset relation in the housing 92 so that head A contacts the "forward" channel, while head B contacts the "reverse" channel on the two-channel magnetic tape. In reproducing the second channel, therefore, the contact arm 123 shifts the input of the amplifier from head "A" to head "B." Alternatively, the machine may be set to stop itself when contact is made between 111 and 112.

For a high speed rewind operation there is provided a rewind plunger 150, having a set of ganged contacts 131, 132, 138, 140 and 145. The plunger 150 is normally biased out of switch closing position by a spring 174. The contact 131, when actuated, operates a release relay 175 which unlatches the armature of solenoid 108 and causes the disengagement of the capstan roller 91 from the tape. As best seen in FIGURE 1, de-energization of the solenoid 108 permits pivoting movement of the roller 91 on a bell crank lever 134 which supports the roller 91. A spring 136 pivots the bell crank lever 134 about its pivot pin 137 and moves the roller 91 into spaced relation to the capstan shaft 51. A stop 135 limits the extent of such pivotal movement.

A second contact 132 provides a muting switch which grounds the input (or output) of the amplifier so that during high speed rewind, there is no objectionable noise passing through the loudspeaker in the magnetic reproducing assembly. The operation of the high speed rewind switch also moves a contact 138 which controls the energization of the motor 38 to energize the motor for high speed operation in the rewind direction.

The centrifugal clutch, previously described, then goes into driving engagement with the spindle 21 to rotate the supply spool in the "rewind" direction.

The rewind plunger 150 also opens contacts 145 to de-energize the capstan and take-up motors. At the same time it throws switch 140 to the upper set of contacts. Near the end of the rewind operation the conductive strip 84*a* on the lower edge of the leader 84 closes the circuit between contacts 100 and 105, energizing a reset solenoid 160 which turns off the machine by releasing the "on" plunger 155, and also releases the rewind plunger 150, thus resetting all rewind switches. As the machine coasts towards a stop the leader 88 comes to the position shown in FIGURE 1. Further pull on the hook 87 by the magazine (which is still coasting) opens hinge 93 and disengages the hooks 87 and 86 so that the magazine can be released. As the tape is completely rewound on the hub 76 of the magazine, and the outer leader 84 has been completely trained about the tape, the hooks 86 and 87 will be unlatched against the action of the spring 94 (FIGURE 6) by the fact that the end of the threading member 84 is restrained from further movement by being anchored on the spindle 62. When the tape is thus detached from the threading member, the cam 41 is then rotated to retract the spindle 21, the spindle 21 being pushed downwardly so that the spring pressed detent 46 is disengaged from the magazine and the magazine can be slipped out of the magazine receiving well 18. The operating mechanism for cam 41 is arranged so that when it is moved slightly past the retract position, a push lever 96 moves the magazine partly out of the casing so that it can be removed readily.

The "on" plunger 155 is shown in the energized condition in FIGURE 9. In this condition, the plunger 155 closes a master power switch 171 which controls the energization of all the motor circuits and amplifier. The plunger 155 is held in the "on" position by a spring pressed pawl 162 which engages the base of a tooth 155*a* on the plunger 155 to overcome the bias of a spring 172 tending to release the plunger 155. Movement of the plunger 155 also opens a switch 173 in parallel with switch 131, to release the capstan after full rewind.

A pair of plungers 178 and 179 are provided to select the direction of travel of the tape. A "forward" plunger 178 is biased into open position by a spring 181. When pushed inwardly, the plunger 178 operates a switch 182 to energize the relay 144 and de-latch the armature 116. A spring 183 moves the armature 116 into a position in which it operates the switch arms 121, 122 and 123 to drive the capstan motor in the forward position and energizes head "A."

For playing the other channel, a "back" plunger 179, normally held open by a spring 186, operates a switch 187 to energize the solenoid 113 and move the switch arms 121 and 122 in the opposite direction, to reverse the direction of rotation of the capstan motor. The switch arm 123 is also moved into a position in which head "B" is energized.

When the solenoid 113 is energized, the switch arm 140 is also moved to its upper contact so that the conductive strip 84*a* in bridging the contacts 100 and 105 will energize the solenoid 160 to turn off the machine when the tape has been played through in the "reverse" direction.

The assembly may be turned completely off by the operation of an "off" button 191 which pivots about a pin 192 against the action of a spring 193. Pressing the "off" button 191 moves the reset bar 161 to the left against the bias provided by a spring 194, thereby disengaging the pawl 162 from the "on" plunger 155, and the pawl 163 from the rewind plunger 150, if the machine is set for rewind at the time.

Movement of the cam 41 into the position in which a magazine unit is to be received in the unit (a position shown in dotted outline in the drawings) also serves to reset the machine for another operation. This movement of the cam 41 operates a reset bar 197 arranged for sliding movement within a guide 200. The bar 197 is composed of a non-conductor and carries a conductive contact arm 197*a* which closes a switch 142, thereby energizing the relay 144, and unlatching the armature 116. The resulting movement of the switch arms 121 and 122 resets the capstan motor for the forward condition.

The reset bar 161 has an extension 161*a* which is attached to a bell crank lever 201. The latter is arranged to depress a pawl 197*b* on the arm 197 to release the latch 148 and thereby put the capstan motor and take-up motor in condition for another threading operation.

Movement of the reset bar 197 also operates a latch bar 148. The latter is normally pivoted against a stop 149 by the action of a spring 151. A solenoid 146, energized by closing of the switch 102 by the tensioning of the leader, controls the movement of an armature 147. When the solenoid 146 is energized against the action of a spring 180 it closes a pair of switches 152 and 153 to close the circuits to the capstan motor 59 and the take-up motor 74.

To permit selective engagement of the capstan roller 91 with the tape, a capstan switch 195 is provided. The switch 195 consists of a spring arm which normally biases the switch between the "on" and "off" position. In the "capstan on" position, the switch serves to short out the contacts 100 and 105 to energize the solenoid 108 and urge the capstan roller 91 against the tape. In the "capstan off" position, the switch energizes the release relay 175 to move the capstan roller 91 out of engagement with the tape.

To prevent the capstan roller 91 from being engaged with the tape during the rewind operation, there may be a mechanical interlock provided between the switch 195 and the rewind plunger 150.

For example, there may be provided features such as an interlock to prevent operation of the loading cam unless the reel is rewound; means for relatching the capstan whenever the "forward" or "back" buttons are pressed; a high speed "forward" condition; "backspacing," momentary halting of tape travel, and the like.

From the foregoing, it will be seen that the present invention provides an improved single spool magazine which is inexpensive to manufacture and which is capable of use in a wide variety of magnetic or electrostatic recording and/or reproducing assemblies, including existing commercial magnetic tape recording machines.

The concepts of the present invention are applicable to electrostatic recording on thin dielectric tapes such as 0.00025 inch thick polyethylene terephthalate film passing between contacting metal electrodes where the electrodes have an alternating current bias voltage, for example of 600 volts R.M.S., superimposed on the signal voltage during recording.

It will be evident that various modifications can be made to the described embodiment without departing from the broad concepts of the present invention. For example, the hook 87 may be fixed to threading member 88 and may be disengaged from hook 86 by manually rotating spool 19 in the clockwise direction. In loading a spool, the spool may be rotated in the counterclockwise rewind direction manually, rather than by means of the drive mechanism of the machine, to engage the hooks 86 and 87.

An important feature of the present invention resides in the fact that the magazine or spool 19 may be applied to the spindle 21 with the coupling hook 86 in any angular orientation which may occur by chance as the user inserts the magazine in the well, and the hook 86 will still be properly engaged with hook 87 as the apparatus is placed in operation.

*Embodiment of FIGURES 10 Through 19*

FIGURES 10 through 19 illustrate a single spool magazine machine comprising a casing 300 receiving a top plate 301 from which the tape transport and amplifier mechanism are suspended. Suitable screws such as indicated at 302 may be provided for securing the plate 301 to the casing 300. As seen in FIGURE 10, the plate 301 may have a cover 304 mounted thereon by means of hinges 305 and 306 and retained in closed position by means of a suitable spring clip such as indicated at 308, FIGURE 11, cooperating with an inturned lip on the front vertical wall **304*a* of the cover. The hinges 305 and 306 are secured to a rear vertical wall 304*b* of the cover. At the left side of the machine, the cover 304 is provided with a continuous vertical wall 304*c*, but on the right side of the machine as best seen in FIGURE 12, the cover is provided with a slot generally indicated at 310 for accommodating loading of a single spool magazine such as indicated at 312, FIGURE 10, in the direction of arrow 313 laterally of the supply spindle 314 shown in FIGURE 12. As will hereinafter be described, the spindle 314 is retracted during the magazine loading operation. The top horizontal wall of the cover 304*d* carries a magazine bearing plate 320 with a raised annular bead 320*a* and a central aperture extending through plate 320 to provide a recess aligned with the spindle 314. The central aperture provides clearance accommodating upward movement of spindle 314** a slight distance above the position thereof shown in FIGURE 12.

As seen in FIGURE 10, the apparatus may be provided with a manual selector knob 323 having "load," "stop," "rewind" and "playback" positions. If the machine is designed to reproduce stereophonic magnetic record tapes, for example, a pair of gain control knobs 325 and 326 may be provided for individually adjusting the volume of reproduction of the respective channels of the tape record. A power switch is indicated at 328 for controlling the supply of power to the drive motor and amplifier of the machine. It may be noted that the knob 323 would be in its extreme counterclockwise "load" position during loading of the tape magazine 312 through the notch 310 of the cover 304 in the direction of the arrow 313. The cover 304 may conveniently have an indentation as indicated at **304*e* so as to expose a portion of the periphery of the supply magazine when the magazine is in operative position in alignment with the spindle 314, so as to facilitate removal of the magazine from the magazine receiving well designated generally by the reference numeral 332 in FIGURE 12. In removing a spool magazine from the well 332, after the spindle 314 is retracted from the magazine, the finger of the user is simply engaged with the top surface portion of the spool exposed at the recess or indentation 304*e* and the spool pulled laterally through the slot 310 in the cover 304**.

FIGURE 11 shows the mechanism below the cover 304 including a take-up spool 335 secured to a take-up spindle 336 by means of a nut 338. The take-up spool 335 may comprise a central hub 340 having an upper flange 342 at one axial side of the hub and a substantially identical lower flange 353, FIGURE 17, at the lower axial side of the hub and spaced from the upper flange 342 a distance somewhat greater than the width of a threading leader 344 and somewhat greater than the width of the tape indicated diagrammatically at 346 and wound on the hub 347 of tape magazine 312. As seen in detail in FIGURE 17, a pin 350 may be disposed in a recess 351 in hub 340 of the take-up spool and may be secured in receiving apertures in upper flange 342 and lower flange 353 of the take-up spool 335. By way of example, the free end of threading leader 344 indicated at **344*a* in FIGURE 17 may be folded back upon itself and secured to define a loop around the pin 350 to permanently secure the threading leader 344 to the take-up reel 335**.

The structure of the single spool magazine 312 corresponds to that illustrated in FIGURES 4 and 5 and includes a pair of opposed annular flange members such as 360 at opposite axial sides of the central hub 347. The annular flange members have centrally disposed apertures such as **360*a* in axial alignment to provide a cylindrical passage entirely through the magazine for receiving the spindle 314. The flange members such as 360 are also provided with radial slots such as 360*b*, one of the radial slots of the lower flange member receiving the pivotally mounted spring urged retractible tooth 362 on spindle 314, FIGURE 12, for providing a positive driving connection between the spindle 314 and the magazine 312. A ball-like spring urged detent member 364 near the top of the spindle 314 is of greater width than the slots 360*b* and acts to retain the magazine on the spindle by overlying the top surface of the upper flange member 360** in operative position of the magazine on the spindle.

The annular flange members of the magazine 312, at the outer peripheries, have confronting end portions or ribs such as indicated at 372 in FIGURE 13 projecting axially toward each other in the same manner as illustrated in FIGURE 5 to define a slot of width somewhat less than the spacing between the upper and lower flange members radially inwardly of the ribs. The tape 346 wound on the hub 347 of the magazine may have a width slightly less than the width of the slot between the ribs on the flange members so that it may extend freely through the slot as it is unwound from the hub 347.

The inner end of the tape 346 is secured, for example, by means of an inner leader, to the hub 347 in any convenient manner, for example by means of a pin similar to the pin 350 of the take-up reel in a recess in the hub 347.

An outer leader 370 has one end secured to the outer end of tape 346. The leader 370 is preferably composed of a reasonably stiff but flexible material such as a fabric impregnated with cellulose resin or other synthetic resin. The tape leader 344 may be composed of the same or similar material. The width of the outer leader 370 is greater than the width of the slot and as best seen in FIGURE 13, the outer leader 370 is received behind the confronting peripheral end portions or ribs such as rib 372 on the lower flange 374 of the magazine 312. With this arrangement, when the outer leader 370 is wrapped around the body of the tape 346 with one or more complete turns, the outer leader 370 serves very effectively as a dust and moisture cover and also as a mechanical shield to protect the body of the tape. The outer tape leader 370 is sufficiently firmly retained by the beads such as 372 so that the magazine may be handled without any danger of loosening or unwinding of the leader 370 and tape 346. The leader 370 nevertheless is still sufficiently flexible that it may be bent slightly across its width and pulled through the slot to unreel the leader and tape from the magazine 312.

The outer free end of the leader 370 is provided with a hook 378 by means of which the threading operation is initiated. The hook may be composed of metal, but may just as readily be composed of a suitable synthetic resinous material. The hook 378 is arranged to cooperate with an eye member 380 secured to the end of the threading leader 344. By way of example, the hook 378 may be formed from a length of wire by folding the wire double at the hook portion 378*a* and providing a generally triangular configuration at the base 378*b*. If the leader 370 is of "Mylar" which is a polyester film, a strip of pressure sensitive tape may be folded over the base leg of the hook. The ends of the pressure sensitive tape may lap opposite surfaces of the end of the tape leader 370 and a further strip of pressure sensitive tape may be wrapped transversely about the ends of the first mentioned pressure sensitive tape strip and about the edges of the end of the tape leader 370. With this type of construction, the taped section of the tape leader assembly indicated at 383 is somewhat stiffer than other portions of the threading leader. A similarly taped portion 385 on the threading leader 344 for securing the eyelet member 380 to the end of the tape leader 344 may be somewhat stiffer than other portions of the threading leader. Of course, many other types of detachable coupling elements may be provided on the tape leader 370 and the threading leader 344.

As seen in FIGURE 11, the threading leader 344 is held adjacent its end by means of a control finger 390 secured to the end of a control shaft 391 and a cooperating pressure member 393 carried on a pivot shaft 394 and spring urged toward the finger 390. As will hereinafter be described shaft 391 is rotated to alternatively space the eye member 380 at the end of threading leader 344 from the magazine 312 and place the eye member in close relation to the magazine in accordance with the position of the selector knob 323. The threading leader 344 follows the normal tape path about a guide post 397 past the multichannel magnetic playback head assembly 398, between the capstan shaft 400 and capstan pressure roller 401 and past a tape guide post 404. The pressure roller 401 is on a shaft 405. As will hereinafter be described in detail, a trigger arm 407 is mounted on a pivot shaft 409 and is operative to sense the passage of the eye member 380 and hook 378 to release the pressure roll 401 for pressure engagement with the capstan shaft 400.

Referring to FIGURE 12, the upper mounting plate 301 supports a lower mounting plate 420 by means including screws 421—426, spacer sleeves 427—432 and nuts such as indicated at 433. The spacer sleeves 427—432 rigidly determine the spacing between the upper mounting plate 301 and the lower mounting plate 420. The driving motor for the tape transport mechanism is indicated at 434 and is secured to the bottom side of the lower mounting plate 420 by means including spacer sleeves 435 and nuts such as 436. The amplifier for the apparatus indicated generally at 437 may be suitably secured to the lower mounting plate 420.

The magazine receiving spindle 314 may be mounted by means of a yoke 440 which is rotatably and reciprocably mounted on a vertical rod 441. The rod 441 is suitably secured at its opposite ends to the upper and lower mounting plates 301 and 420. In the illustrated embodiment, a spindle actuating arm 444 is provided for shifting the yoke 440 and the spindle 314 between an upper and a lower position. The arm 444 is fixedly secured to a shaft 446 mounted for rotation in bearings 448 and 449, FIGURE 14, which are secured to the lower mounting plate 420. A spindle lifting cam 450 is fixed to the end of shaft 446 and cooperates with a roller 451 carried on a screw 452 secured to yoke 440. As the control arm 444 is rotated in the counterclockwise direction from the position shown in FIGURE 12, cam 450 rotates in the counterclockwise direction to disengage the arcuate notch 450*a* from the roller 451. Initially, roller 451 together with yoke 440 and spindle 314 move upwardly slightly as the roller 451 rides on the raised portion 450*b* of the cam face. Thereafter, the yoke 440 and spindle 441 move progressively downwardly as the roller 451 rides along the surface 450*c* of the cam until in a horizontal orientation of the cam 450, the spindle 314 is fully retracted from the well 332 to accommodate loading or unloading of a tape magazine such as 312.

In loading a tape magazine into the well 332, the spindle control arm 444 is initially in its extreme counterclockwise position to retract the spindle 314 from the magazine receiving well 332. The cover 304 may carry a pair of guide brackets 460 and 461 as indicated in FIGURES 10 and 12 and a limit pin 463 to guide the magazine 312 into proper position in the well 332 so that the apertures through the magazine such as 360*a* will be in substantial vertical alignment with the spindle 314. As indicated in FIGURE 12, the spindle 314 has a generally pointed upper end 314*a* of generally conical configuration for engaging the central aperture of the magazine 312 in spite of slight vertical misalignment between the aperture and the central axis of the spindle 314. As the control arm 444 is swung in the clockwise direction from its extreme counterclockwise position, the roller 451 rides along the cam surface 450*c* to gradually raise the spindle in the well 332. The end 314*a* of the spindle enters the central aperture of the magazine to the point where the detent 364 engages the bottom surface of the lower flange 374 of the magazine 312 after which the magazine is raised with the spindle until the top surface of the top flange 360 of the magazine engages the annular bead 320*a*, FIGURES 10 and 12. Further clockwise rotation of the arm 444 presses the spindle 314 into the central aperture of the magazine, and as the roller 451 rides on the raised cam surface portion 450*b*, the detent 364 is pressed into a position overlying the top flange 360 of the magazine reel 312. In this position, the lower surface of the lower flange 374 of the magazine reel 312 rests on the shoulder 314*b* of the spindle. As the control arm 444 is rotated the final distance in the clockwise direction, the roller 451 drops into the arcuate recess 450*a* of the cam 450 to allow the spindle 314 to drop to the position shown in FIGURE 12 where the magazine reel 312 will be properly spaced in the well 332 for rotation, being disposed above the top mounting plate 301 and out of contact with the annular bead 320*a*. As rotation of the spindle 314 is initiated, the spring pressed tooth 362 will snap into one of the radial notches such as indicated at 360*b* in FIGURE 11 of the bottom flange 374 of the magazine reel to establish a positive driving connection between the spindle and the magazine. In operative position of the magazine in the well 332, the periphery of the magazine spool 312 may be spaced from side plates 460 and 461 and pin 463 a distance somewhat less than the radius of the central aperture 360*a* of the magazine reel. The spacing is, of course, such that if the magazine spool 312, in loading thereof, is pressed against the pin 463, for example, the misalignment between the center of aperture 360*a* and the spindle will be less than the radius distance of the aperture 360*a*. Similarly, if the reel 312 is pressed into contact both with the side plate 460 and the pin 463 in loading, the point 314*a* of spindle 314 must still be vertically aligned with a portion of the central aperture of the magazine spool.

Referring to FIGURE 12, it will be observed that the motor 434 has a motor shaft 480 extending through the bottom mounting plate 420. The shaft has a pulley 482 with an annular groove about the periphery thereof receiving a friction drive belt 484 for driving the capstan flywheel 486. The flywheel has an annular groove about the periphery thereof near the lower end in which the belt 484 extends in a loop. The pulley 482 may have an integral sleeve portion 482*a* which is fixed to the shaft 480 by means of a set screw, for example. The motor shaft 480 is also provided at its upper end with a driving sleeve 490 having an annular groove for receiving a rubber tire or ring 491. The tire 491 is fixed to the sleeve 490 which may in turn be fixed to the motor shaft 480 by means of a suitable set screw. The driving tire 491 is disposed at a level to engage a lower drive wheel 493*a* which is coupled to an upper driven wheel 493 fixed to spindle 314. The coupling between wheels 493*a* and 493 is shown as comprising a felt-washer type slipping friction clutch 496. By way of example wheel 493*a* may be free to rotate relative to spindle 314 and may be urged upwardly against friction washer 496 by means of spring washer 753 to tend to rotate spindle 314 in the rewind direction when selector knob 323 is moved to "rewind" position to swing wheel 493*a* into engagement with driving tire 491.

As seen in FIGURE 14, selector knob 323 is coupled to a shaft 500 journalled in an aperture in upper mounting plate 301 and in a bearing lug 502 secured to the lower mounting plate 420. At the lower end of the shaft 500 is secured a switch actuator 504 for actuating a pair of switch actuating buttons 506 and 507 of a switch assembly 508 in "playback" position of the selector switch knob 323. The switches controlled by buttons 506 and 507 may serve as muting switches to cut out the sound when the selector switch is not in "playback" position.

Also mounted on the selector knob shaft 500 is a control disk 510 having an irregular cam slot therein 520, FIGURE 15, receiving a cam follower pin 522 which is carried o na bell crank 525 as indicated diagrammatically in FIGURE 15. As seen in FIGURE 12, bell crank 525 is mounted by means of a post 530 having a screw 532 extending therethrough from the top of the mounting panel 301, the screw having a washer 534 and a nut 535 at the lower end thereof for retaining the bell crank for pivotal movement on the screw. A nut 538 serves to retain the pin 522 in fixed relation to the end of bell crank 525 so that rotary movement of control knob 323 is translated into oscillatory movement of bell crank 525 on the axis of screw 532. As indicated in FIGURE 15, bell crank 525 is coupled to yoke 440 by means of a link 540. The link 540 is connected with crank 525 by means of a pivot 543 and has a central aperture slidably and pivotally receiving a vertical rod 550 carried between opposed spaced arms 553 and 554 projecting from the yoke 440. Thus, the pivotal connection between the link 540 and the yoke 440 is maintained as the yoke 440 moves vertically on its mounting shaft 441 in raising and lowering spindle 314 from the magazine receiving well 332.

As seen in FIGURE 14, gain control knobs 325 and 326 are secured to vertical shafts 560 and 561 controlling suitable mechanism within the chassis 437. The power on-off switch 328 is mounted on a shaft 564 having a suitable switch connected thereto within the chassis section indicated at 437.

Reference numeral 570 in FIGURE 12 represents a spring arm which may be utilized to urge a detent ball indicated diagrammatically at 571 into each of four notches in a detent wheel 573 carried on the shaft 500 to accurately determine the four switching positions of selector switch 323. The teeth on the detent wheel 573 serve to actuate a follower plate 580, FIGURE 14, having a rounded end portion for fitting in the successive notches or grooves between the successive teeth of the wheel 573 in rest positions of the selector knob 323. There are three teeth on the detent wheel in addition to those coacting with the detent ball so that the follower plate 580 is actuated in a horizontal direction away from the detent wheel 573 each time the selector knob 323 is moved to a new position. The detent plate 580 is secured to a linkage arm 583 by means of a pair of screws 584 and 585, the screw 584 also serving to secure one end of a crank 588 to the follower plate 580. The crank 588 is mounted on a screw 590 extending through the top mounting panel 301 for pivotal movement in response to the reciprocating movement of the follower plate 580. As seen in FIGURE 15, crank 588 has a rod 593 connected thereto by means of an eye member 594 on the end of the rod and a rivet 596 extending from the end of the crank 588. Thus, as the selector knob is changed to a new setting, outward movement of the follower plate 580 rocks crank 588 in the clockwise direction causing rod 593 to press spring arm 600 in the direction toward pulley 493 on supply spindle 314. Arm 600 carries a suitable friction pad 602 which engages the smooth metal surface of the pulley 493 to exert a braking action thereon during shifting of the selector knob 323. The spring arm 600 is illustrated as being mounted on a fixed post 605 secured by means of a screw 606 extending through the mounting plate 301 and receiving a washer 608 and nut 609 at its lower end.

Actuation of the linkage 583, FIGURE 15, rocks crank 615 on its pivot screw 616 in the blockwise direction to retract brake actuating rod 619 to press a friction pad 622 on spring arm 624 toward take-up pulley assembly 626 which is mounted on the take-up shaft 336. The mounting post for the spring arm 624 is secured to the underside of the mounting panel 301 by means of a screw 628, nut 629 and washer 630, and the actuating rod 619 is coupled to crank 615 by means of an eye member 632 and a rivet 634. It will be understood that spring arms 600 and 624 return to their normal positions with the friction pads 602 and 622 substantially out of contact with wheels 493 and 626 as a result of their fixed mounting and their resiliency. The return of spring arm 624 to normal position will cause follower plate 580 to return to initial position between successive teeth of the detent wheel 573.

As seen in FIGURES 12 and 14, a coupling arm 650 is also secured to selector knob shaft 500 and has a forked end secured to a linkage member 652 by means of a pin 653. As seen in FIGURE 15, the linkage arm 652 has a cam plate 655 secured thereto by means of screws 656 and 657 and coacting with a crank arm 660 by means of a follower pin 661 on one end of the crank 660. The crank 660 is pivotally mounted by means of a screw 662 extending through the top mounting panel 301 and has its opposite end coupled to a spring 665. A spring 667 has one end secured to the mounting panel 301 by means of a screw 669 and has its opposite ends connected to pin 661 of the crank 660 to maintain the follower pin 661 in engagement with the cam surface of cam member 655. The spring 665 provides a lost motion coupling between a pin 680 on a rocking lever 682 and a pin on the end of crank 660 indicated at 685. In load position of the selector arm, spring 667 rocks crank 660 in the counterclockwise direction and the movement of crank 660 and pin 685 is transmitted to lever arm 682 by means of a lost motion coupling within spring 665 to pivot lever arm 682 in the counterclockwise direction until it engages stop 684. Lever arm 682 is rigidly fixed to the shaft 391 which as seen in FIGURE 11 carries the guide arm 390 which presses the threading leader 344 into engageable relation with the tape leader on the magazine 312. In the playback position of the selector switch knob, which is the position represented in FIGURE 15, the rocking lever 682 is again in a generally counterclockwise position which corresponds to a generally clockwise extreme position of the guide arm 390 as viewed in FIGURE 11.

In "stop" position of the selector switch knob 323, pin 661 engages cam plate 655 substantially at point 655*a* to rock crank 660 to its extreme clockwise position as viewed in FIGURE 15 to tension spring 665 and to rotate rocking lever 682 to the extreme clockwise position in engagement with stop 686. Arm 390 remains in this position as the selector switch knob 323 is moved to "rewind" position and pin 661 of crank 660 then engages cam plate 655 generally at point 655*b* indicated in FIGURE 15.

It will be observed from FIGURE 15, that rocking lever 682 is coupled to an arm 687 on shaft 394 by means of a spring 688 so that the pressing member 393 seen in FIGURE 13 is always urged into engagement with the guide arm 390 and will follow clockwise movement of the arm 390 (as viewed in FIGURE 13) through the action of the spring 688.

The linkage arm 652 carries a roller 690 for actuating an arm 691 which is pivotally mounted by means of a screw 692 extending from the top side of mounting panel 301. The roller 690 is secured to the linkage 652 by means of a screw 693. As best seen in FIGURE 16, the arm 691 has a pair of extensions 691*a* and 691*b* engaging on opposite sides of the roller 690 for moving the arm 691 with the linkage 652 in either direction. FIGURE 16 shows the control selector shaft 500 in the angular position for "playback" mode and it will be apparent that as the shaft 500 is moved in the clockwise direction as viewed in bottom plan in FIGURE 16 and indicated by the arrow toward the "load" position, lever arm 691 will be rocked in the counterclockwise direction about pivot 692. Cam surface 691*c* on lever arm 691 will then engage follower pin 694 to rock crank 695 in the clockwise direction about its pivot 696. Extension 697 fixed to crank 695 will also swing in the clockwise direction as a unit with crank 695 to cause the pin 698 to ride on a cam surface 700 of a trigger arm 701 to rotate the trigger arm 701 in the counterclockwise direction about its shaft 409 which extends to the top side of the mounting panel 301 and there carries the trigger finger 407. In "load" position of the selector knob, pin 698 is retained in notch 701*a* of trigger arm 701 by the action of spring 703 until such time as the threading leader hook portion 385 in conjunction with the tape leader hook portion 378 actuates the trigger finger 407 in the clockwise direction as seen in FIGURE 11 to rotate shaft 409 in the counterclockwise direction as seen in FIGURE 16 to release pin 698 for travel in the counterclockwise direction under the urging of spring 704. Spring 704 has one end secured by means of a screw 705 extending through the mounting panel and has its other end secured to an end of crank 695 by means of a rivet 706. The spring 703, of course, has one end secured to the trigger arm 701 and has its opposite end secured to a post 707 fixed to the mounting panel 301.

As seen in FIGURE 15, the linkage arm 652 has its remote end coupled to a drive control lever 710 by means including a shaft having a reduced diameter threaded end 711 to provide for pivotal movement of the lever arm 710 about its pivot shaft which has a reduced diameter threaded end 712. The lever arm 710 is provided with a cam slot 713 coacting with a pin 714 fixed to an arm 715 which is rotatable on a pivot shaft 716. A brake arm 717 is fixed to the shaft 716 as is the arm 715 so as to provide a braking force on take-up reel idler pulley 720 through the medium of friction pad 721 in the extreme counterclockwise position of the shaft 716 and to substantially release the braking force in the extreme clockwise position shown in FIGURE 15 with the pin 714 in a recess 713*a* of cam slot 713. Also in the extreme clockwise position of pivot shaft 716 as seen in FIGURE 15, an idler wheel 723 establishes driving connection between capstan shaft 400 which extends from the flywheel 486 as indicated in FIGURE 14 and the take-up reel drive pulley 720 of assembly 626 to drive the take-up reel 335 in the take-up direction. As indicated in FIGURES 14 and 15, the capstan shaft has an enlarged diameter portion 400*a* extending upwardly from the flywheel 486 for driving engagement with the idler pulley 723. The tape engaging portion of the capstan shaft 400 is of reduced diameter as indicated in FIGURE 11. The idler wheel 723 may be provided with an annular rubber tire 724 seated in a groove therein for frictional driving engagement with the cylindrical surfaces of the capstan shaft portion 400*a* and the take-up drive pulley 720.

As best seen in FIGURE 14, the take-up reel drive pulley 720 may be urged by means of a compression spring 726 axially upwardly toward a cooperating driven wheel 727 fixed to the take-up reel shaft 336, the drive wheel 720 being free to rotate relative to the take-up spindle 336. A suitable frictional material generally indicated at 728 is interposed between the opposing surfaces of wheels 720 and 727 to provide a frictional coupling therebetween. In this way, the drive wheel 720 may rotate at a speed in excess of the take-up reel shaft 336 so as to apply a winding tension to the take-up reel continuously as the tape is wound onto the take-up reel.

The compression of spring 726 may be controlled by means of a collar 730 fixed to the take-up spindle 336, a washer 731 being interposed between the collar 730 and one end of the spring and a further washer 732 being interposed between the opposite end of the spring and the drive wheel 720.

For urging the idler wheel 723 into engagement with the capstan 400 and take-up drive wheel 720, a spring 734, FIGURE 15, is connected between the arm 715 and a fixed post indicated at 735 secured to the mounting panel 301. The arm 715 carries the idler wheel 723 by means of an extension 736 pivotally secured to the arm 715 by means of a member 737 and rotatably carrying the idler pulley 723 by means of shaft 739.

As seen in FIGURE 15, a dashpot mechanism 740 is provided in association with the supply spindle 314, the mechanism being mounted on the yoke 440 by means of a bracket 741 fixedly secured to the yoke 440. The mechanism comprises a dashpot cylinder 742 secured to bracket 741 and a link 743 connected with the dashpot piston and coupled by means of a pivot 744 to an actuating arm 745 loosely encircling the spindle 314. A tension spring 746 is connected between the arm 745 and the bracket 741 to normally maintain the dashpot piston in its retracted position with the arm 745 in its extreme counterclockwise position. The arm 745 is coupled to the wheel **493*a* and thus to the supply spindle 314 by means of a pair of friction disks 750 and 751 on opposite axial sides of the arm 745, the upper friction disk 750 being pressed against the underside of the wheel 493*a* by means of a spring washer 753 bottomed against a nut 754 secured to the spindle 314. A smooth metal washer may be interposed between the spring washer 753 and the lower friction disk 751. Spindle 314 is free to rotate relative to the arm 745**.

During rewind operation, wheel **493*a* is rotating in the clockwise direction as seen in FIGURE 15 to tend to move the arm 745 to its extreme clockwise position against the action of spring 746. At the end of the rewind operation, the selector knob 323 is moved from the "rewind" position to the "stop" position and the threading leader in this latter position is pressed against the supply spool magazine by means of the guide arm 390. This frictional engagement of the guide arm may tend to prevent counterclockwise rotation of the spindle as seen in FIGURE 15 under the urging of the spring 746. However, as the selector knob is moved to "load" position, the guide arm 390 as seen in FIGURE 11 is retracted from the supply spool magazine, and the wheel 493*a* is rotated in the counterclockwise direction as seen in FIGURE 15 by means of spring 746 to rotate spindle 314 in the clockwise direction as seen in FIGURES 11 and 13. This clockwise rotation of the spindle 314 may move the hook 378 through a substantial arc to a position such as indicated in FIGURE 13 to completely disengage the hook 378 from the eye member 380**.

To further assist in disengagement of hook 378 from eye 380, the cam slot 520 in the cam disk 510 associated with the selector knob 323 may be so configured as to move the supply spindle 314 in the clockwise direction about pivot shaft 441 as seen in FIGURE 15, as the selector knob is moved from the "stop" position to the "load" position. This corresponds to movement of spool 360 in the direction of arrow 748 as viewed in FIGURE 13.

FIGURES 17 to 19 illustrate an automatic stop for the take-up reel wherein an arm 760 is pivotally mounted by means of a pin 761 in a recess 762 of core 340 and is spring urged by means of a compression spring 763 and plunger 764 out of the recess to place pin 765 on the free end of arm 760 in the path of a forked stop bracket 766 secured to the top mounting panel 301 beneath the lower flange 353 of the take-up reel. The pin extends through a curved slot **353*a* in the lower flange 353, which is best seen in FIGURE 17. Thus, at the end of the rewind operation, pin 765 is pressed outwardly by spring 763 into engagement with the bracket 766 to stop the take-up reel at a predetermined angular position which corresponds to a proper positioning of the eye member 380, FIGURE 13, for engagement with the hook 378 of a supply magazine on the supply spindle 314. As indicated in FIGURE 19, when the reel is rotated in the clockwise direction during "playback" operation, the threading leader 344 is wrapped over the arm 760 and presses the arm into the recess 762 to provide a substantially cylindrical winding surface for the leader 344**.

If desired, a retarding action may be applied to the take-up reel 335 prior to the time when the pin 765 engages the bracket 766. For example, a second actuating arm similar to 760 may be provided which is adapted to be uncovered by the leader 344 prior to release of arm 760. Projection of the second arm similar to arm 760 may actuate a suitable brake to begin slowing of the rotation of the take-up reel prior to the time when the pin 765 engages bracket 766. It will be understood that the second arm may be fixed to a shaft similar to pin 761 which shaft carries an actuating device at its lower end below the lower flange 353 of the reel, which actuating device would operate a suitable brake when the second arm assumed a position similar to the position of arm 760 shown in FIGURES 17 and 18. This allows very high speed rewind with smooth stopping and positioning at the end of the rewind operation.

Preferably shaft 446, FIGURE 12, is linked to selector knob 323 (for example by gearing, levers, or cam action) in such a way that cam 450 is in the position shown in FIGURE 12 when selector knob 323 is in the "stop" "rewind" or "playback" positions; but when the selector knob is turned to "load" position, cam 450 is turned counterclockwise so that the follower 451 rests on cam surface **450*c*, retracting the shaft 314. The separate manually actuated lever 444**, FIGURE 12, can then be eliminated.

As a modification of the embodiment of FIGURES 10–19, a take-up reel such as indicated at 801 in FIGURE 20 may be substituted for reel 335, FIGURE 11, and the threading leader 344 discarded. The single spool magazine 312 can be used with this modified machine by cutting off hook 378, FIGURE 13, from the tape leader 370. The tape from the supply spool is manually threaded in this modification, and the end of the tape leader is looped about pin 805, FIGURE 20, of the take-up reel to connect the tape with the take-up reel. On rewind, the tape leader 370 may be automatically disengaged from the pin 805, FIGURE 20, and automatically wrapped onto the supply spool magazine as a protective and retaining cover with the assistance of guide finger 390, FIGURE 13. The flanges of take-up reel 801 have, of course, a sufficient spacing to freely receive the greater width of the tape leader 370.

As a further modification of the embodiment of FIGURES 10–19, the leader connecting the tape with the supply spool may be provided with suitable electric conductive strips or the like for providing automatic stop or reverse operation of the drive mechanism as in the embodiment of FIGURES 1 through 9, for example.

*Summary of Operation for the Embodiment of Figures 10–19*

Summarizing the operation of the embodiment of FIGURES 10 through 19, the magazine supply reel 312 is inserted in the direction of the arrow 313, FIGURE 10, into the well 332, FIGURE 12, defined by side brackets 460 and 461 and pin 463, FIGURE 10, depending from the cover 304. With the supply spool pressed against any two of the members 460, 461 and 463, the central aperture of the supply spool 312 will be automatically engaged by the spindle 314 as the spindle is raised into the magazine well 332 by means of the crank arm 444. As previously mentioned, the raised portion **450*b* of cam 450 causes the spindle 314 to be momentarily raised above the final position illustrated in FIGURE 12 to cause the detent 364 to engage over the top surface of the supply spool 312, after which the retraction of the spindle 314 to its final position spaces the spool 312 for free rotation in the well 332**.

During the loading operation, the lever 444 is in its extreme counterclockwise position with the spindle retracted, and the lever is moved to the position illustrated in FIGURE 12 after the supply magazine 312 is inserted into the well 332. The selector knob 323 is in the "load" position during loading of the supply magazine into the well. With the supply magazine properly disposed on the spindle 314, the selector knob 323 is moved to the "stop" position which causes guide arm 390, FIGURES 11 and 13, to swing into operative position relative to the magazine 312 with the eye 380 on the threading member 344 in contact with the tape leader 370 wound on the magazine 312 and in engageable position relative to hook 378 on the tape leader 370.

When the selector knob 323 is now moved to "rewind" position, supply spindle 314 is pivoted about rod 441 in the counterclockwise direction as viewed in FIGURE 15 to place drive wheel **493*a*** in engagement with drive sleeve 490 on motor shaft 480. Magazine 312 is then driven in the counterclockwise direction, FIGURE 13, until hook 378 on the tape leader 370 moves into engagement with eye member 380 on the threading leader 344.

When selector knob 323 is moved to "playback" position, wheel 493*a* on spindle 314 is moved out of engagement with the motor drive sleeve 490 to disengage the rewind drive, and linkage 652, FIGURE 15, is retracted to rock lever arm 710 in the clockwise direction, FIGURE 15, to allow pin 714 to enter recess 713*a*. In this position lever 715 is allowed to move to its extreme clockwise position under the urging of spring 734, FIGURE 15, to press the idler pulley 723 into engagement with the capstan shaft portion 400*a* and the take-up reel drive pulley 720 to drive the take-up reel in the clockwise direction as seen in FIGURE 11. Rotation of take-up reel 335 in the clockwise direction winds the threading leader 344 onto the take-up reel to depress the take-up reel stop arm 760 shown in FIGURE 19 into its recess. During threading, as the parts 385, 380, 378 and 383 of the threading and tape leaders travel about capstan roller 401, they project therefrom sufficiently to engage trigger arm 407, FIGURE 11, and rotate the arm slightly in the clockwise direction as seen in FIGURE 11, corresponding to counterclockwise rotation of shaft 409 as viewed from the bottom in FIGURE 16 to release pin 698, FIGURES 15 and 16, from notch 701*a*, allowing spring 704 to pivot crank 695 in the counterclockwise direction and moving pressure roll 401 to press the tape against the capstan 400. The tape 346 is now driven by means of the capstan shaft at constant speed, and the speed of the take-up reel 335 is such as to wind the tape uniformly and with suitable tension onto the take-up reel.

At the end of the "playback" operation, selector knob 323 may be moved to "rewind" position to engage the rewind drive and rewind the tape onto the magazine 312. The capstan pressure roller 401 is held in an open position during rewind, such that the hook 378 and eye member 380 can pass between the capstan and pressure roller, and so that the tape can rewind without hindrance from the capstan. As the final loop of the threading leader 344 about the take-up reel is unwound, spring 763, FIGURE 17, presses the braking arm 760 to a position with its pin 765 in the path of the forked bracket 766 as indicated in FIGURE 17 to stop the rewind operation at the precise desired point with the eye member 380 properly positioned for disengagement from the hook 378 on the magazine and for reengagement with the corresponding hook of a new magazine.

The selector switch knob is now moved to "stop" position to disengage the rewind drive and then to "load" position which latter movement causes the highest part of raised portion 691*c* of lever arm 691, FIGURE 16, to cock the trigger arm 701 in readiness for a new threading cycle. Additionally, as previously described, movement of the guide arm 390, FIGURE 11, away from the magazine 312 as the selector knob 323 is moved to "load" position enables the spring 746, FIGURE 15, to move arm 745 in the counterclockwise direction as viewed in FIGURE 15 to rotate supply spool 312 in the clockwise direction as viewed in FIGURE 13 to disengage hook 378 from the eye member 380. Movement of the selector switch to "load" position may also swing the magazine 312 about the pivot rod 441, FIGURE 15, in a direction of arrow 748, FIGURE 13, away from the threading leader eye 380 to further facilitate disengagement of the threading leader 344 from the tape leader 370 of the magazine 312.

The crank 444, FIGURE 12, may now be rotated in the counterclockwise direction to lower spindle 314 from the well 332 and thus release the magazine 312 for removal and replacement by a new magazine.

*Embodiment of FIGURE 20 Through 25*

The present embodiment illustrates the manner in which an existing commercial machine was adapted to receive single spool magazines such as illustrated in detail in FIGURES 4 and 5. The single spool magazine has been designated by the reference numeral 19 in FIGURE 20 since it may be identical to the single spool magazine of FIGURES 4 and 5. The supply spool magazine is mounted on a supply spindle 800 of the machine and a take-up reel 801 is mounted on a take-up spindle 802 of the machine. A threading leader 804 is secured to reel 801 in any suitable manner. By way of example, the end of the threading leader 804 may be in the form of a loop which is inserted over a pin similar to pin 805 associated with the slot indicated by reference numerals 806*a* and 806*b* in the lower flange 806 of the reel. The threading leader 804 extends along the normal path of the tape in the machine past a guidepost 808, a magnetic transducer head 809, between a capstan 810 and pressure roller 811 and past a guidepost 812. The end of the threading leader 804 carries an eye member 814 which is adapted to interengage with hook 86′ on the end of the tape leader. The eye member 814 is held by means of a clamping assembly 815 which is part of the mechanism adapting the conventional machine to single spool operation. The clamping mechanism 815 may be secured to the top panel of the machine in any suitable means, for example by means of double faced pressure sensitive adhesive tape.

The clamping mechanism 815 is designed to automatically move the eye member 814 on the end of the threading leader 804 into engageable relation to the hook 86′ as the supply spool 19 is placed on the spindle 800. The actuator bracket 817, best seen in FIGURE 22, is designed to receive the supply spool between its upper and lower arms 817*a* and 817*b* as the supply spool is moved onto the supply spindle in the direction axially of the spindle. As indicated in FIGURE 22, as the supply spool is moved in the axial direction, the lower flange 78 contacts the lower arm 817*b* of the actuating bracket to pivot the bracket about pin 818, whereupon the upper arm 817*a* swings into overlying relation to the upper flange 77 of the supply spool. This counterclockwise pivoting of the bracket 817 on the pin 818 causes a back edge 817*c* of the bracket to engage an upstanding lug 819 on actuating arm 820 to pivot the actuating arm about rivet 821. A flat spring 822 bent about pin 823 coacts with two angularly related surfaces 817*d* and 817*e* of the bracket 817 to give a toggle action which snaps bracket 817 into either the position shown in FIGURE 22, or the position shown in FIGURE 20 where the bracket has been rotated approximately 60° in the counterclockwise direction to a generally horizontal orientation of arms 817*a* and 817*b*, and with the arms spaced from the supply spool to allow free rotation thereof.

Actuation of the bracket 817 in the counterclockwise direction during loading of the supply spool, causes arm 820 to pivot in the counterclockwise direction as viewed in FIGURES 20 and 21. A pin 825 depending from a clamping arm 826 extends into an aperture 820*a* in arm 820 so that arm 826 rotates in the clockwise direction about pivot 827, as arm 820 rotates in the counterclockwise direction, thus moving the end of the threading leader 804 toward the periphery of the supply reel. A clamping arm 828 is also mounted on the pivot 827 and moves with the arm 826 in the clockwise direction because of the confronting clamping fingers 830 and 831 carried by the respective arms for engaging the end of the threading leader 804. A flange 830*a* is carried by the finger 830 and overlies the top edges of the fingers to confine the top edge of the threading leader. The finger 830 may also be provided with a lower flange 830*b* for supporting the lower edge of the threading leader 804 when it is clamped between the fingers 830 and 831. A spring 833 extends between the clamping arms 826 and 828 for causing the arm 828 to follow counterclockwise movement of arm 826 as bracket 817 is pivoted in the clockwise direction during removal of the supply spool 19 from the spindle 800. In the illustrated embodiment, pivots 821 and 827 are secured to a base plate 835 which in turn may be secured to the top panel of the recorder machine, for example by means of a suitable adhesive. Pins 818 and 823 associated with the actuating bracket 817 are mounted by means of a suitable support bracket indicated at 836 and suitably secured to the base plate 835.

After the supply spool 19 has been inserted on the spindle 800 to pivot the actuating bracket 817 and swing the eye member 814 of the threading leader 804 into engageable relation to the hook 86' of the supply spool, the supply spool 19 may be rotated manually in the clockwise direction to interengage the hook 86 with the eye member 814 without any necessity for manually grasping the tape or threading leader. When the hook and eye member are interengaged, the recorder may be shifted to the "play" mode of operation whereupon the pressure roller 811 is moved toward the capstan 810 to establish driving engagement between the threading leader 804 and the capstan 810. At the same time the take-up spindle 802 is rotated in the counterclockwise direction to begin winding the threading leader 804. The hook 86' and eye 814 travel between the clamping fingers 830 and 831 which are flared at their opposite ends to accommodate passage of the hook and eye member therebetween. Spring 833 accommodates separation of the fingers 830 and 831 as required during passage of the hook and eye member.

The pressure roller 811 may have a rectangular groove as indicated at **811*a* therein centrally of the axial extent thereof to accommodate passage of the hook 86' which preferably has a limited extent in the direction across the width of the tape as compared with the width of the threading leader and tape. The pressure roller is, of course, operative to engage the tape at opposite sides of the slot 811*a* so as to adequately establish driving engagement between the tape and the capstan 810**.

As the threading leader 804 is wrapped about the hub 842 of the take-up reel 801, a retracting finger 844, FIGURE 24, is engaged by the threading leader to pivot the finger about a pin 845 and thereby retract brake actuating lug 847, which as best seen in FIGURE 25 is pivotally mounted by means of a horizontal pin 848. A spring 849 normally urges the actuating lug 847 into the exposed position shown in FIGURE 25 where it is capable of actuating trigger arm 850 of brake mechanism 840 during clockwise rewind rotation of the take-up reel 801. Pin 851 extending between the flanges of the take-up reel limits counterclockwise pivoting of the finger 844 about the pivot 845.

When the tape has been played and is fully wound on the take-up reel 801, the recording mechanism may be set for rewind operation, for example, in which condition the pressure roller 811 may be spaced from the capstan 810. As the threading leader 804 begins to unwind from the take-up reel, finger 844 is released and shifted to the position shown in FIGURE 24 by means of the spring 849 allowing spring 849 to cause actuating lug 847, FIGURE 25, to be locked in the counterclockwise direction to the position shown in FIGURE 25, ready for engagement with the trigger arm 850 of the brake mechanism 840. Preferably, the first layer of the threading leader as it is wound on the take-up reel 801 has a slot therein accommodating projection of the finger 844 therethrough as indicated at **804*a* in FIGURE 24, so that as the second layer of the threading leader 804 is unwound from the take-up reel 801, the finger 844 is actuated to the position shown in FIGURE 24, whereupon the trigger finger 850 is actuated to apply the brake. The braking force is such that the take-up reel has practically stopped when it reaches the angular position shown in FIGURE 20, so that the angular momentum of the supply spool 19 and the friction of the clamping fingers 830 and 831 is sufficient to stop the take-up reel 801 exactly in the position shown in FIGURE 20 through the medium of the threading leader 804. Under these circumstances, the eye member 814 will be stopped at the proper position relative to the clamping assembly 815. The supply spool 19 may now be rotated slightly in the counterclockwise direction to disengage hook 86 from the eye member 814 and the supply spool lifted axially to shift the bracket 817 to the position shown in FIGURE 22 and correspondingly shift the eye member 814 away from the supply spindle 800** in preparation for receiving a further spool.

FIGURE 23 illustrates the brake mechanism 840 in cocked position wherein brake shoe 854 on brake arm 855 is retracted from engagement with the edge of the lower flange of the take-up reel. The brake arm 855 is mounted pivotally by means of a rivet member 857 secured to a base plate 858 which may in turn be secured to the top panel of the machine by means of a suitable adhesive, for example. In cocked position, a pin 859 on trigger arm 850 engages in a notch **855*a* in brake arm 855 and is retained in this position by means of an over-center action wherein the pin 859 is held in the notch by the action of spring 860 and the brake arm 855 is prevented by means of the pin 859 from rotating in the clockwise direction about the pivot 857 under the urging of the spring 860. The spring 860 is secured to the pivot 862 for the trigger arm 850**.

When lug 847 engages the end of trigger arm 850 during rewind, it pivots the trigger arm 850 in the counterclockwise direction about pivot 862 releasing pin 859 from the notch **855*a*, whereupon spring 860 is operative to pivot brake arm 855 in the clockwise direction to press the brake shoe 854 against the take-up reel and bring the take-up reel to a stop. As previously mentioned, after the take-up reel has stopped, the manual actuating tab 841 may be pulled to rock trigger arm 850 in the clockwise direction about its pivot 862 and thereby move the pin 859 back into the notch 855*a* in preparation for another cycle of operation. The lug 847 has a sloping back surface as indicated at 847*a*, so that when the take-up reel is rotating in the counterclockwise direction, the trigger arm 850 is not actuated, even if the finger 844 is in the position shown in FIGURE 24, and the spring 849 accommodates pivoting of the actuating lug 847 in the clockwise direction about pin 848** as the reel rotates in the counterclockwise direction.

*Summary of Operation for the Embodiment of FIGURES 20 Through 25*

It will thus be seen that the present embodiment provides means for converting existing commercial machines to single spool operation. The illustrated embodiment involves the application of a clamping mechanism 815 to the top panel of the machine, as well as a braking mechanism 840, and the provision of a specialized take-up reel 801.

The clamping mechanism is initially in the position where actuating bracket 817 is oriented as shown in FIGURE 22. As a supply spool is inserted onto the spindle 800 in the axial direction, bracket 817 is rocked in the counterclockwise direction to swing the clamping fingers 830 and 831 in the clockwise direction about pivot 827 to position eye member 814 of the threading leader 804 in engageable relation to the hook 86' on the supply spool. The supply spool is then rotated manually in the clockwise direction to engage the hook 86 in the eye member 814, after which the machine is ready for normal play or record operation.

During rewind, for example as the second layer of the threading leader 804 is unwound from the hub 842 of the supply reel 801, an actuating finger 844 is moved to the position shown in FIGURE 24 by spring 849 to project an actuating lug 847 as indicated in FIGURE 25. The leading edge **847*b*** of this lug engages the trigger finger 850 as the take-up reel 801 rotates in the clockwise direction as seen in FIGURE 20, to actuate the finger and apply the brake shoe 854 to the periphery of the reel 801. The brakes are applied at such a point, that the take-up reel is stopped each time at substantially the orientation shown in FIGURE 20 with the eye member 814 held in the proper position by means of the clamping mechanism 815. The supply spool 19 may now be rotated slightly in the counterclockwise direction to disengage hook 86' from eye 814 and the spool 19 lifted in the axial direction to return the actuating bracket 817 to the orientation shown in FIGURE 22 and to correspondingly retract eye member 814 from the position shown in FIGURE 20.

It will be apparent to those skilled in the art, that this type of an adapter may be applied to substantially all of the existing commercial tape recording machines, so that these machines can be readily adapted to take advantage of semi-automatic threading in conjunction with the single spool magazine of the present invention.

Figure 33:
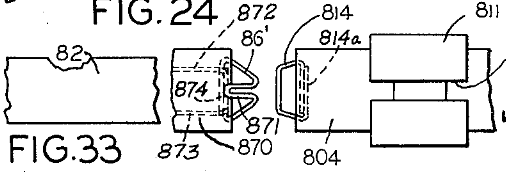

FIGURE 33 illustrates hook 86' and eye member 814 in side elevation and the same configuration of hook and eye member may be utilized in FIGURES 10 through 19. An advantageous construction is obtained when the hook and eye members are formed of plastic covered wire, which combines strength with protection for the surfaces of the magnetic transducer head 809 and the like. Many alternative constructions of the coupling elements will occur to those skilled in the art. As another example, the coupling element for the threading leader 804 may be formed in the leader itself as by punching a suitable aperture. Similarly the tape leader 870 carrying the hook 86' may have a hook formed by embossing instead of the hook 86'.

Where necessary, the embodiment of FIGURES 20 through 25 may be operated by manually releasing the brake assembly 840 while rewind driving force is being applied to the supply spool 19, so that the leader 804 will pull the spool 801 into the position shown in FIGURE 20 regardless of errors in the position thereof as stopped by the brake shoe 854. After release of the brake assembly 840, the rewind control would be placed into neutral, of course, before the hook 86' was disengaged from the eye member 814 by manual rotation of the spool 19. The rewind drive is preferably provided with a clutch capable of slipping at the end of the rewind operation to prevent stalling of the motor or wear on the drive mechanism. Alternatively, the brake assembly 840 can operate a switch to deenergize the motor circuit when tripped by the catch 847*b*, FIGURE 25.

Referring to FIGURE 33, the hook 86' may comprise a double wire portion 871 projecting at an angle of about 25° from the plane of leader 870. The overall width of the double length of wire 871 may be .046 inch and substantially less than the width of groove 811*a* into which it will project as the hook 86' travels past roller 811. Wires 872 and 873 are rigidly fastened to the base of hook 86' and are secured to the leader 870 by means of a suitable adhesive strip (not shown) wrapped transversely about the end of leader 870 so as to insure that double wire portions 871 will project at the desired angle of 25° to the plane of leader 870. Specifically, the end of leader 870 may have a reduced width end portion extending around the base 874 of hook 86' and between wires 872 and 873, and a strip of pressure sensitive tape (not shown) may be wrapped transversely over the doubled end of leader 870 and across wires 872 and 873. Wires 872 and 873 may be made of .005 inch diameter piano wire while hook 86' may be of .018 inch diameter piano wire. Double wire portion 871 may have a length of .150 inch, and wires 872 and 873 may be spot welded to base 874.

Latching loop 814 may have the part thereof projecting from leader 804 bent at an angle of 45° to the plane of leader 804. The bent part of loop 814 may have a length of 1/16 inch while the part thereof secured to leader 804 may also have a length of 1/16 inch. The loop may be of .018 inch diameter music wire and the loop may have a width of .240 inch. The leader 804 may have a reduced width end portion extending around the base 814*a* of loop 814 and back upon itself and be secured by means of an adhesive strip (not shown) wrapped transversely about the doubled end of leader 804. The looped portion of leader 804 may fit tightly around base 814*a*, and the adhesive strip may overlap longitudinally extending parts of loop 814 adjacent base 814*a* to stabilize this loop and maintain the outer part thereof at the desired angle of 45° to the plane of leader 804.

*Embodiment of FIGURES 26, 27 and 28*

FIGURES 26 through 28 illustrate an automatic changer mechanism which may be applied, for example, to the machine of FIGURES 1 through 9 or the machine of FIGURES 10 through 19. By way of example, if the changer mechanism is to be applied to the machine of FIGURES 10 through 19, cover 304 of the machine would be removed and replaced by a cover 880 similar in configuration to the cover 304 except for the provision of an aperture 881 axially aligned with respect to the spindle 314 of the machine. In this case, supply spools such as 882, 883, 884 and 885 are supplied to the magazine receiving well 887 of the machine in the vertical direction axially of the spindle 314, and are ejected from the magazine receiving well in a direction radially of the spindle 314, for example in the direction opposite to the direction of arrow 313 in FIGURE 10. The supply spools may be stacked in a cylindrical guide tube 889 which in the illustrated embodiment may be secured to the top cover member 880. The tube may have a solid annular portion 889*a* at its lower end and may have slots 890 and 891 extending to the top edge of the tube and of size to provide access to the supply spool, so that the supply spools may be lowered into the tube, rather than dropped, if desired. Alternatively, the guide tube may be removable from the machine and may be designed to have removable covers, so that the supply spools may be stored in the tube when not in use. In this case, a slidable cover may be provided which may be removed after the tube is in position on the machine so that no handling of the individual supply spools would be necessary. Each of the single spool magazines may be identical to that illustrated in FIGURES 4 and 5, except that the successive spools are provided with upper and lower annular beads such as indicated at 893 for spacing the marginal edges such as 894 of the successive spools for a purpose to be hereinafter described.

The mechanism for automatically delivering successive single spool magazines to the well 887 comprises a plurality of vertical rods such as indicated at 895 and 896 carrying spool engaging eccentrically mounted disks 897, 898, 899 and 900. As the rods 895 and 896 are rotated on their axes one or the other of the associated disks is always in a position to support the supply spools. The configuration of the disks is further such that as disks 898 and 900 begin to move out of supporting relation to the flange of spool 883, disks 897 and 899 begin to move into supporting relation to the lower flange of spool 884, so that a point is reached in the rotation of the rods 895 and 896 where supply spool 883 is not supported by disks 898 and 900 while supply spool 884 is supported by disks 897 and 899.

After the tape on supply spool 882 has been played in the manner described in connection with FIGURES 10 through 19, selector knob 323 is moved from "rewind" position to "stop" position and then to "load" position. As knob 323 is moved to "load" position mechanism may be provided for automatically retracting the spindle 314. Alternatively, as indicated in FIGURE 12, crank 444 may be manually actuated to retract the spindle 314 from the supply spool 882. After the spindle 314 has been retracted to the position shown in FIGURE 28, ejector fingers such as indicated at 903 may be actuated to eject the spool 882 in the direction of the arrow 904 which may be opposite to the direction of the arrow 313 in FIGURE 10. There may be a pair of fingers such as indicated at 903 riding in slots 906 and 907 at opposite sides of the supply spindle 314 as seen in FIGURE 26. The fingers may be guided by means of brackets 909 secured to the underside of the top panel 301 of the machine. The horizontal part 903*a* of the finger 903 may extend along the lower side of the panel 301 as indicated in FIGURE 28 and may be actuated by any suitable mechanism which, for example, may be automatically actuated in response to retraction of the spindle 314 to the position shown in FIGURE 28. The fingers such as 903 are actuated in the direction of the arrow 904 and may, for example travel to the end of the slots such as 906 and then be immediately retracted in preparation for a change cycle of the rods 895 and 896. The spool which is ejected from the well 887 may be collected by means of any suitable hopper, chute or the like and may, for example, be fed directly into a receiving tube similar to the tube 889. After the fingers have returned to the position shown in FIGURE 28, the mechanism is ready for a change cycle.

The rods 895 and 896 may be rotated by any suitable mechanism and rotation may be initiated upon return of the ejector fingers such as 903 to their initial position after retraction of the spindle 314. By way of example, as viewed in FIGURE 27, rod 895 may rotate in the clockwise direction as rod 896 rotates in the counterclockwise direction to initiate a change cycle. As the rods rotate, the disks 897 and 899 first move into supporting relation to the lower flange of spool 884 after which disks 898 and 900 move out of supporting relation to the flange of spool 883 allowing spool 883 to drop into the well 887 with its central aperture indicated at 911 in substantial vertical alignment with the spindle 314. Continued rotation of the rods 895 and 896, or rotation of the rods in the opposite direction, first moves disks 898 and 900 into supporting relation to the spools and then moves disks 897 and 899 out of supporting relation to the flanges of spool 884 whereupon spools 884 and 885 drop onto the disks 898 and 900. A change cycle of the rods 895 and 896 has now been completed and the rods have returned to their initial orientation shown in FIGURES 26 and 27. Upon completion of the change cycle of rods 895 and 896, spindle 314 may be automatically raised. As the spindle 314 is raised, detent 364 on the spindle will engage the lower flange of the new spool 882 and raise the spool slightly against the disks 913 and 914 which may have the identical configuration of the disks 898 and 900 and may have the same orientation on the rods 895 and 896. After the detent 364 has been pressed through the aperture 911 of the spool 883 into overlying relation to the top flange of the spool, spindle 314 is retracted slightly as described in connection with FIGURE 12 to space the top flange of the spool 883 from the disks 913 and 914, so that the new spool is disposed for free rotation in the well 887.

It will be apparent to those skilled in the art that if the changer mechanism of FIGURES 26, 27 and 28 is applied to the embodiment of FIGURES 1 through 9, the playing of a multiplicity of supply spools may take place entirely automatically. Thus, the tube 889 would be disposed vertically above the supply spindle 21 in FIGURE 1 with the changer rods 895 and 896 disposed on opposite sides of the well 18 so that the spools are ejected by fingers such as indicated at 903 in the direction laterally of the spindle 21 and to the left as seen in FIGURE 1. With this embodiment, when the machine was placed in operation, the changer mechanism would be automatically operated to deliver the first supply spool to the well 18, after the completion of the changer cycle, shaft 442 would be automatically actuated to raise the spindle 21 into operative relation to the spool, after which the cam 441 on shaft 442 would close switch contact 190 to energize motor 38 at low speed to engage hooks 86 and 87, whereupon forward operation of the machine would automatically be initiated by switch 102. After the tape has been played in the forward direction, the machine may be automatically actuated by means of contacts 111 and 112 to play the other channel of the tape as the tape is rewound onto the supply spool. The contacts 100 and 105 may be utilized to deenergize the drive when the tape has been fully unwound onto the supply spool, after which shaft 42 is rotated in the direction to retract the spindle 21, and the ejecting fingers such as 903 are automatically actuated to eject the supply spool which has been played. The changer mechanism may then be automatically actuated to deliver a new supply spool to the well 18, after which the shaft 42 is again automatically rotated to raise the spindle 21 and initiate play of the new record. This cycle may be repeated until all of the supply spools have been played, without any intervention of the user of the machine.

It will be understood that the dimension of the tube 889 is such as to insure proper registry of the supply spools with the changer disks 897–900, and that the showing in FIGURES 26 to 28 is intended to illustrate the principle of operation, rather than to give working dimensions of the various parts. It is preferable that the changer disks overlap the flanges to such an extent that adequate support will be provided in any extreme position of the spool within the tube 889. No attempt has been made to show the precise configuration of the disks required, since the configuration of the disks for a practical application can be readily provided by those skilled in the art from the foregoing description.

It will be understood that the machine utilized in the embodiment of FIGURES 26, 27 and 28 may be arranged so that the selector knob 323, FIGURE 10, is automatically moved to select a backward driving position, when the tape has been played in the forward direction, and preferably a second channel of the record is played as the tape is rewound onto the supply spool. When the tape is completely rewound, the selector 323 preferably moves automatically through "stop" position into the "load" position, and preferably such movement to the "load" position actuates cam 450, FIGURE 12, in the counterclockwise direction so as to retract the shaft 314. Retraction of shaft 314 may automatically initiate a cycle of the ejector mechanism 903.

*Summary of Operation for the Embodiments of FIGURES 26, 27 and 28*

For the illustrated embodiment, where the changer mechanism has been shown as applied to the embodiment of FIGURES 10 through 19, the operation is as follows. The supply spool such as 882—885 placed in the tube 889 in the desired order with the lower supply spool resting on the disks 898 and 900. With the selector switch 323 in the "load" position and the spindle 314 retracted as indicated in FIGURE 28, the changer rods 895 and 896 are rotated sufficiently so that the disks 897 and 899 move into supporting relation to the lower flange of spool 883, after which disks 898, 900, 913 and 914 are moved out of the path of supply spool 882 to allow the supply spool 882 to drop into the magazine well 887. The changer cycle is now completed by rotation of the rods 895 and 896 back to the orientation shown in FIGURES 26 and 27 with the disks 898 and 900 supporting the stack of spools 883, 884 and 885 as indicated in FIGURE 26. Thereafter, crank 444 is rotated in the counterclockwise direction to the position shown in FIGURE 12 to project the spindle 314 into the aperture 911 of the spool 882. The detent 364 seen in FIGURE 28 lifts the spool to press the top flange against the disk 913 and 914 in order to enable the detent 364 to be pressed through the aperture into overlying relation to the top flange of the spool 882, after which the spindle 314 is retracted slightly due to the depression 450*a* in cam 450 as seen in FIGURE 12.

The selector knob 323, FIGURE 10, is then moved from "load" to "rewind" to cause engagement of hook 378, FIGURE 13, with eye member 380 on the threading leader 344. The selector knob is then moved to "playback" position to play the tape. After rewinding the tape onto the supply spool 882, crank 444, FIGURE 12 is actuated in the clockwise direction to retract the spindle 314, and ejection fingers such as 903 in FIGURE 28 are actuated to eject the spool 882 in the direction of arrow 904 out of the magazine well 887. The fingers 903 are then retracted to the position shown in FIGURE 28, and the changer rods 895 and 896 are rotated through another cycle to deliver the supply spool 883 to the magazine well 887. The cycle of operation is then repeated. While the illustrated embodiment may require a number of manual operations, it is apparent that the entire operation of the machine in playing a number of supply spools may be automatic once the guide tube 889 is loaded with the desired spools and the machine set in operation.

Further, a series of supply spools may be stored in a container similar to the container 889, and the entire container with the spools therein bodily placed on the machine and detachably secured thereto.

*Embodiment of FIGURES 29 Through 32*

FIGURES 29 through 32 illustrate an adaptation of an existing commercial machine wherein the modifications are such that they would normally be introduced by the manufacturer, but the machine has the advantage that much retooling and the like is avoided, since a majority of the existing parts of the commercial machine need not be modified.

The machine comprises a housing 925 having a supply spindle 926 and a take-up spindle 927. A take-up reel 928 is mounted on the spindle 927 and has a threading leader 930 secured thereto, for example in the same manner as described in connection with FIGURE 20. The threading leader may be held at its free end by means of a holding mechanism 931 including an arm 932 pivotally mounted by means of a pin 933 beneath the top panel 934 of the housing. Above the panel 934, the arm 932 may comprise a pair of spring urged clamping fingers similar to those illustrated in FIGURE 21 including the flared finger portions 830 and 831 with the top flange 830*a* and the lower flange 830*b* and spring 833 urging the fingers together. An arm corresponding to 826 in FIGURE 21 may be fixedly secured to the mounting arm 932, while the other arm corresponding to 828 may be pivotally mounted on arm 932 and spring urged toward the first arm. The arms corresponding to 826 and 828 in FIGURE 21 may extend below the panel 934, while the clamping fingers corresponding to 830 and 831 may extend upwardly through slot 934*a* in the top panel. The arm 932 is constructed to swing about the pivot 933 to swing the entire threading leader clamping assembly designated generally by the reference numeral 936 into successive fixed positions corresponding to notches 934*b*, 934*c* and 934*d* in opening 934*a* of the panel 934. The arm 932 may carry a suitable spring pressed detent for selective locking in the notches such as 934*b* to fix the clamping assembly 936 in suitable positions for different diameter supply reels. The clamping mechanism 936 is so disposed that the eye member 938 at the end of the threading leader 930 is disposed in engageable relation with the hook on the supply spool 940. The threading leader 930 is sufficiently stiff so that the eye member 938 will assume the desired position when the threading leader is clamped by mechanism 936. By way of a suitable material for the threading leader 930, a .005 inch "Mylar" strip, for example having a width of 5/16 inches has been found to have the desired properties. With such a material, when the spool 940 is inserted onto the spindle 926 axially of the supply spindle, the eye member 938 is deflected out of the way by the lower flange of the supply spool and then spring stacked into the position shown in FIGURE 29 in proper engageable relation between the flanges of the supply spool when the supply spool is properly in place on the machine. As in the embodiment of FIGURE 20, the supply spool is then given a slight clockwise rotation manually to engage the eye member 938 with the hook on the supply magazine in the same manner as described in connection with FIGURE 20. The rotation of the spool may aid in causing eye member 938 to reassume the position shown in FIGURE 29 if this does not occur when the spool is placed on the spindle.

The illustrated machine further comprises a transducer head 941, a capstan 942, a pressure roller 943 and a control guide 944 along the tape path. A manual control 945 is provided which when moved to the right from the central position shown conditions the machine for fast forward movement of the tape and in its extreme left position conditions the machine for rewind operation. The machine further is provided with vertically depressible buttons including a forward button 946, a stop button 947 and a record button 948. The controls 945–948 are mounted above a raised panel portion 934*a* of the cover 934 of the machine as seen in FIGURE 31.

Once the eye member 938 is engaged with the hook of the supply spool 940, control 945 is moved to the "fast forward" position to energize the take-up spindle 937 and begin winding the threading leader 930 onto the take-up reel 928. During this time, as illustrated in FIGURE 31, the threading leader 930 retains the shaft 944*a* of guide 944 in an upper position wherein an interlock link 950 prevents the forward button 946 from being depressed. In the "fast forward" position of control 945, pressure roller 943 is spaced from the tape path as seen in FIGURE 29, so that the hook and eye member 938 are free to pass between capstan 942 and pressure roll 943. Specifically, a collar 951 on shaft 944*a* maintains link 950 in an extreme counterclockwise position where end 950*a* of link 950 underlies a shoulder 946*a* on the shaft of button 946 to prevent downward movement of the button 946. The threading leader 930 is of greater width than the tape which is indicated at 953 in FIGURE 32 and may have a nominal width of ¼ inch (.246 inch plus or minus manufacturing tolerances) where the leader has a width of about 5/16 inch. Thus, when the eye member 938 travels past the guide 944, the guide 944 will drop to its lower position illustrated in FIGURE 32 rocking link 950 in the clockwise direction to move end 950*a* out of the path of shoulder 946*a* on the forward button. The forward button 946 may now be depressed to begin play of the tape 953 with the pressure roller 943 pressing the tape against the capstan 942 to provide a constant speed drive.

FIGURE 30 illustrates the mechanism for controlling the application of the brake to the take-up spindle 927 as the tape is rewound onto the supply spool 940. As seen in FIGURE 30, shaft 944*a* of guide 944 has an end portion 944*b* which in lower position of the guide 944 blocks rotation of a link 955 which controls application of brake arm 956 to take-up wheel 957 on the take-up shaft 927. Thus in the condition shown in FIGURE 30, a spring 960 urges link 955 to rotate in the clockwise direction about a pivot shaft 961 and thus presses the end of the link against end portion 944*b* of guide 944. In this position of the link 955 a hook 955*a* at the opposite end of the link engages a cooperating hook 963*a* associated with arm 963 connected to the brake arm 956. In this condition, the brake arm 956 is spaced from the wheel 957, but is urged by means of spring 964 toward the wheel 957 about its pivot shaft 965. During rewind, when the threading leader 930 begins to pass under the generally conical head portion 944*c* of the guide, the guide 944 is wedged to its upper position moving end 944*b* out of the blocking position to allow link 955 to be pivoted in the clockwise direction against stop 967 releasing brake arm 956 to apply a braking force to the take-up spindle 927. The guide shaft 944 is guided in its vertical movement by means of a bearing sleeve diagrammatically indicated at 969 which is secured to the underside of the panel 934. The portion of the threading leader 930 adjacent eye member 938 may gradually increase in width from ¼ inch to 5/16 inch to provide a wedging action as the threading member moves under the guide 944 during rewind operation.

The brakes may be reset for a subsequent operation by any suitable means. For example, moving the control knob 945 to the fast forward position may first pivot brake arm 956 in the clockwise direction about shaft 965 to the position shown in FIGURE 30, after which the link 955 may be swung about shaft 961 in the counterclockwise position to place hook 955*a* in the path of hook 963*a*. Thereupon, as soon as the threading leader 930 is moved past the guide 944 during the threading operation, the guide shaft 944*a* will assume its lower position as seen in FIGURE 30 and prevent return of the link 955 to its brake actuating position. Thereafter, when the control knob 945 is released from the fast forward position, the parts assume the position shown in FIGURE 30 in readiness for a subsequent braking operation during rewind. To avoid any question of a complete disclosure, it may be noted that the brake mechanism may be reset manually within the scope of the present disclosure.

When a larger size supply spool is to be utilized the arm 932 is set to a position in notch 934*c* or 934*d*. If desired, spring 964 (or other braking springs) may be coupled to arm 932 in such a way as to increase the braking force when the arm 932 is set to take larger spool diameters which have greater inertia. If desired, the supply spindle 926 may have a brake mechanism associated therewith controlled by the trigger 955 in a manner similar to that illustrated in FIGURE 30 for the take-up spindle 927.

*Operation of the Embodiment of FIGURES 29 Through 32*

In this embodiment, the clamping assembly 936 is first set in the desired position in accordance with the size of the supply spool to be received on the spindle 926. In the case of the smallest diameter spool as shown in FIGURE 29, the mounting arm 932 is placed at notch 934*b* to place eye member 938 on the end of the threading leader 930 in engageable relation to the cooperating hook on the supply spool 940. In placing the supply spool 940 on the spindle 926, the lower flange of the supply spool 940 deflects the eye member 938 radially outwardly from the spindle 926, after which the resiliency of the threading leader 930 causes the eye member 938 to return to its position in engageable relation to the hook on the supply spool as indicated in FIGURE 29. The supply spool 940 may now be rotated manually in the clockwise direction to engage the hook on the supply spool with the eye member 938 in the same manner as described in connection with FIGURE 20.

The control knob 945 is now moved to the right to the fast forward position to wind the threading leader 930 onto the take-up reel 928. As eye member 938 moves past vertically reciprocable guide 944, the guide drops to its lower position indicated in FIGURE 32 releasing the interlock shown in FIGURE 31 for the forward button 946 and placing the lower end 944*b* of the guide 944 in blocking relation to the link 955 to maintain the brakes in set position. The brakes may be held in set position through linkage with the control 945 and movement of the control to the fast forward position may rotate the brake arm 956, FIGURE 30, in the clockwise direction about pivot shaft 965 and move link 955 in the counterclockwise direction about shaft 961 to set the brake mechanism during the threading of the tape by means of the threading leader 930. When the control 945 is returned to its central position, the brake mechanism is maintained in its set condition as illustrated in FIGURE 30 with the tape 953 accommodating the lower position of the guide 944 as seen in FIGURE 32.

For rewinding the tape onto the supply spool 940, control 945 is moved to its left hand "rewind" position, to cause supply spindle 926 to rotate rapidly in the clockwise direction. When the threading leader 930 begins to pass under the guide 944, the guide is raised because of the greater width of the threading leader to unblock link 955 and release the brake arm 956 to brake the take-up reel 927. The brakes are applied at such a point, that the take-up reel will be substantially stopped when the threading leader reaches the condition shown in FIGURE 29 with the eye member 938 substantially at the position indicated in FIGURE 29 and held by the clamping mechanism 936. The supply spool 940 may now be manually rotated slightly in the counterclockwise direction and lifted from the spindle 926 and a new spool placed on the spindle.

It may be noted that during fast forward and rewind operation the pressure roller 943 is spaced from the tape, so that the eye member 938 and the hook on the tape leader may freely pass between the capstan 942 and the pressure roller 943.

As a further embodiment of the present invention, a juke box type automatic selector machine may have a series of single spool magazines such as shown at 19 in FIGURE 4 mounted in a row with their axes aligned. The spools may be supported in a series of compartments which are open at the top, but are provided with spool supports engaging the lower portions of the flanges 77 and 78 at the axial sides and the marginal edges thereof to confine the spools in the compartments against a horizontal movement in the axial direction and against horizontal movement in the transverse or radial direction, while allowing removal of the spools from the respective compartments in the upward direction. A pivot shaft may be provided having an axis generally parallel to the series of compartments and generally at the horizontal level of the centers of the spools. This pivot shaft may carry a pair of clamping fingers which are normally spaced in the axial direction a distance slightly greater than the width of the spools so that as the pivot shaft is rotated the clamping fingers will move into engageable relation to a selected spool with the clamping fingers disposed on opposite sides of the spool generally about the level of the center of the spool. The clamping fingers may have rubber pads at the inner surfaces thereof for engaging the respective flanges of the spool with a frictional grip, whereby upon pivoting of the pivot shaft in the opposite direction, the selected spool may be removed from its compartment.

The pivot shaft may have a threaded shaft extending therein and rotatable or relative thereto and this threaded shaft may have oppositely threaded portions with respective nuts thereon which will be caused to move axially toward each other and axially away from each other depending upon the direction of rotation of the threaded shaft. These nuts on the threaded shaft may have flanges extending through longitudinal slots in the pivot shaft and secured to the respective clamping fingers at the exterior of the pivot shaft so that upon rotation of the threaded shaft in one direction the clamping fingers are moved toward each other while upon rotation of the threaded shaft in the opposite direction the clamping fingers are moved away from each other. It will be understood that the nuts are fixed against rotation with the threaded shaft, for example by means of the flanges thereof extending in the longitudinal slots of the pivot shaft. Similarly, the clamping fingers are mounted on the pivotal shaft for slidable movement in the axial direction, but are presented from rotation relative to the pivot shaft, for example by virtue of their connection with the nuts on the threaded shaft.

Suitable automatic indexing means may be provided for moving the pivot shaft in the axial direction to transversely align the pair of clamping fingers with any desired spool. Thereafter, the mechanism may be automatically energized to rotate the pivot shaft to swing the clamping fingers from a vertical orientation to a horizontal orientation with the rubber pads on the free ends of the clamping fingers disposed on the opposite sides of the selected spool and horizontally aligned with the central portion of the spool. Thereafter, the double threaded shaft is rotated in the direction to move the clamping fingers axially toward each other to clamp the spool therebetween. The pivot shaft is then rotated in the opposite direction to swing the clamping fingers back to the vertical orientation and thereby to lift the selected spool upwardly out of its compartment. The pivot shaft may then be translated to move the selected spool to a position transversely aligned with the magazine receiving well of a play-back machine similar to that shown in FIGURE 1. The play-back machine has its magazine receiving well corresponding to that at 18 in FIGURE 1 opening vertically upwardly and so aligned that the axis of the spindle 21 is parallel to the pivot shaft axis. The magazine receiving well would be so disposed that when the clamping fingers were rotated to a horizontal orientation, the spool would be inserted partially into the well, for example slightly less than half way. It will be understood that the orientation of the well in the automatic selector machine would correspond to that of the well 18 of the machine of FIGURE 1 if the machine of FIGURE 1 were stood on its right hand end as seen in FIGURE 1.

With the selected spool partially in the magazine receiving well of the play-back machine, the clamping fingers are moved axially away from each other by means of the threaded shaft to release the spool and allow the same to drop into operating position exactly corresponding to that shown in FIGURE 1 except for the orientation of the machine. The spindle 21 is then inserted into the spool automatically, for example in response to the presence of the spool in the magazine receiving well, and the spool may be played automatically.

After completion of the play-back of the recorded tape on the spool, the spindle 21 may be automatically retracted from the magazine receiving well, and a suitable ejecting finger may be automatically energized to raise the spool until a major portion thereof projects above the well in position for re-engagement with the clamping fingers. The clamping fingers are then again moved axially toward each other by means of the threaded shaft to clamp the spool, and the pivot shaft is then rotated to restore the clamping fingers to the vertical orientation to lift the spool upwardly out of the magazine receiving well. The pivot shaft may then be actuated in the axial direction to automatically return the spool to its compartment.

Suitable indexing mechanisms are well known to those skilled in the art for sequencing the actuations of the pivot shaft and threaded shaft as above described to automatically select any of the spools and to automatically place the same in the play-back machine for reproduction and to automatically return the spools to the compartments.

The machines of the present invention are adapted to play stereophonic records, and it is possible to use two playback heads of fixed spacing but movable laterally of the stereophonic record tape for playing both dual channel stereophonic records and four channel stereo tapes having a first portion of thhe signal recorded in one direction of movement of the tape on two channels and having the remaining portion of the signal recorded on two other channels with the tape moving in the opposite direction. In accordance with the present invention, the two playback heads are movable between three successive positions laterally of the tape and the outputs of the heads may be connected to either of the two playback amplifiers of the stereophonic system. To illustrate the invention by way of a specific example, so suppose that an ordinary dual channel stereophonic tape has a total width of 1/4 inch and has a first track A 3/32 of an inch wide adjacent one margin of the tape and a second channel B 3/32 of an inch wide adjacent the opposite margin of the tape with a 1/16″ space at the center of the tape between the two channels. Suppose further, that a four channel twin stereo tape has outer channels A1 and A2 adjacent the opposite margins of a 1/4″ wide tape and has inner channels B1 and B2 on opposite sides of the centerline of thhe tape. In this type of tape, the channels are arranged from one margin of the tape to the other in the order A1, B2, B1, A2 where channels A1 and B1 are to be played or scanned in the forward direction of tape movement and channels B2 and A2 are to be scanned in the reverse direction of tape movement. It will be understood that channels A1 and A2 correspond to one microphone position and one speaker position of the playback system while channels B1 and B2 correspond to another microphone and another speaker of the playback system. For simplicity, let us assume that each of the four channels has a width of 3/64 of an inch and that the spacing between channels A1 and B2 and between B1 and A2 is 1/64 of an inch while the spacing between channels B2 and B1 is 2/64 of an inch. For such a system, the playback heads may have a width of approximately 3/64 of an inch and may have a fixed center to center lateral spacing of 8/64 of an inch.

With such a system, when playing an ordinary two channel stereophonic tape, the heads are positioned in what may be termed a midposition with a centerline of midway between the center points of the two heads coinciding with the centerline of the tape. Thus, in this midposition of the heads, the center of the head A scanning channel A will be disposed 1/16″ in from the outer margin of the tape so that there will be a distance of 5/128″ between one margin of the head A and the adjacent margin of the tape and a distance of 1/128″ between the opposite lateral margin of the head and the adjacent margin of the channel A. The head B scanning the B channel of the tape will be in a corresponding position relative to channel B, that is only 1/128″ from the inner margin of channel B, but 5/128″ from the outer margin of the tape.

If now a four channel stereophonic tape is to be played, the heads are moved to what may be termed an upper position with head A centered on channel A1 and head B centered on channel B1. In this position the lateral margins of the heads will substantially coincide with the lateral margins of the respective channels for the values given. Head A1 will be connected to the input of a first amplifier, which may be termed the A channel amplifier, while head B will be connected to the input of the second amplifier which may be termed the B channel amplifier. When tracks A1 and B1 have been played, the heads are shifted to what may be termed a lower position where head A is centered on channel B2 and head B is centered on channel A2. In this case, head A will be switched to be connected to the input of the B channel amplifier while head B will be switched to be connected to the input of the A channel amplifier. As previously, the head A will have its lateral margins substantially coinciding with the lateral margins of track B2, while head B will have its lateral margins substantially coinciding with the lateral margins of track A2, for the numerical values given.

Thus, by using two narrow track playback heads, which are shiftable between three successive positions, and whose outputs may each be connected to either of the playback amplifier systems, either regular two channel stereophonic tapes or the four channel stereophonic tapes may be played. It will, of course, be understood that the specific numerical examples given are merely exemplary, and that the principles of this invention may be readily applied to other analogous problems.

The present application is a continuation-in-part of my copending application Serial No. 690,042 filed October 14, 1957, now abandoned.

It will be understood that the various embodiments of the present invention which have been disclosed herein are merely by way of example and not of limitation, and that many other variations and modifications will be apparent to those skilled in the art.

I claim as my invention:

1. In a recording or reproducing assembly, take-up means arranged to wind up an elongated record member and having a threading leader for coupling to the record member, a single spool magazine having an elongated record member thereon, and means responsive to coupling of said threading leader and said recorder member to actuate said take-up means.

2. In a recording or reproducing assembly, a tape spool, a recording tape trained about said spool, a leader on the outer extremity of said tape, a spindle arranged to receive said tape spool in driving engagement, take-up means arranged to receive said tape from said spool, a threading member associated with said take-up means, means providing a detachable coupling between said leader and said threading member, and means responsive to the initial engagement of said coupling means to operate said take-up means.

3. In a recording or reproducing assembly, a spindle arranged to rotatably mount a tape spool, take-up means arranged to receive a record tape from a spool mounted on said spindle, a threading member associated with said take-up means for drawing tape from said spool, and means actuated by movement of said threading member for initiating operation of said take-up means.

4. In a recording or reproducing assembly, a spindle arranged to rotatably mount a tape spool, take-up means arranged to receive a record tape from a spool mounted on said spindle, a threading member associated with said take-up means for drawing tape from said spool, and sensing means responsive to tensioning of said threading member for initiating operation of said take-up means.

5. A magnetic record magazine comprising a single spool having a central hub, spaced annular flange members extending from said hub, said flange members having axially extending confronting peripheral portions defining a slot, a magnetic tape trained about said hub and arranged to pass freely through said slot, and a leader having one end secured to the outer end of said tape, said leader having a width greater than the width of said slot and being positioned radially inwardly from said confronting peripheral portions to thereby provide a protective cover for said tape, and a coupling member secured to the other end of said leader.

6. In a recording or reproducing assembly, a spindle arranged to receive a supply spool having an elongated record medium thereon and to support said spool for rotation during unwinding of the record medium therefrom, take-up means arranged to receive the record medium, a transducer head disposed along the path of the record medium from the supply spool to the take-up means for coupling to the record medium, and a threading member connected to the take-up means and extending along the path of the record medium for detachable connection with the record medium on the supply spool to lead the record medium along said path and onto said take-up means, and means comprising a coupling on the end of the record medium and a cooperating coupling on the end of the threading member for providing automatic connection of the threading member with the record medium irrespective of the initial angular orientation of the coupling associated with the supply spool as the spool is initially placed in operative relation on the spindle.

7. In a recording or reproducing assembly, a spindle arranged to receive a supply spool having an elongated record medium thereon and to support said spool for rotation during unwinding of the record medium therefrom, take-up means arranged to receive the record medium, a transducer head disposed along the path of the record medium from the supply spool to the take-up means for coupling to the record medium, a threading member connected to the take-up means and extending along the path of the record medium for detachable connection with the record medium on the supply spool to lead the record medium along said path and onto said take-up means, means comprising a coupling on the end of the record medium and a cooperating coupling on the end of the threading member for providing automatic connection of the threading member with the record medium irrespective of the initial angular orientation of the coupling associated with the supply spool as the spool is initially placed in operative relation on the spindle, and a rewind drive arrangement for rotating said spindle in a rewind direction, and means whereby said rewind drive arrangement is energized after a spool is placed on the spindle to move the coupling on the record medium into engagement with the coupling on the threading member.

8. In a recording or reproducing assembly, a spindle arranged to receive a supply spool having an elongated record medium thereon and to support said spool for rotation during unwinding of the record medium therefrom, take-up means arranged to receive the record medium, a transducer head disposed along the path of the record medium from the supply spool to the take-up means for coupling to the record medium, a threading member connected to the take-up means and extending along the path of the record medium for detachable connection with the record medium on the supply spool to lead the record medium along said path and onto said take-up means, means comprising a coupling on the end of the record medium and a cooperating coupling on the end of the threading member for providing automatic connection of the threading member with the record medium irrespective of the initial angular orientation of the coupling associated with the supply spool as the spool is initially placed in operative relation on the spindle, a rewind drive arrangement for rotating said spindle in a rewind direction, means whereby said rewind drive arrangement is energized after a spool is placed on the spindle to move the coupling on the record medium into engagement with the coupling on the threading member, and means whereby said take-up means is automatically energized in response to tensioning of the threading member when the coupling on the record member is engaged with the coupling on the threading member.

9. In a recording or reproducing assembly, a spindle arranged to receive a supply spool having an elongated record medium thereon and to support said spool for rotation during unwinding of the record medium therefrom, take-up means arranged to receive the record medium, a transducer head disposed along the path of the record medium from the supply spool to the take-up means for coupling to the record medium, a threading member connected to the take-up means and extending along the path of the record medium for detachable connection with the record medium on the supply spool to lead the record medium along said path and onto said take-up means, means comprising a coupling on the end of the record medium and a cooperating coupling on the end of the threading member for providing automatic connection of the threading member with the record medium irrespective of the initial angular orientation of the coupling associated with the supply spool as the spool is initially placed in operative relation on the spindle, means defining a spool receiving well at said spindle for receiving the spool in a direction laterally of the spindle, and means whereby the spindle is retracted from the well during insertion of the spool and is thereafter moved axially into the well in driving engagement with the spool.

10. In a recording or reproducing assembly, a spindle arranged to receive a supply spool having an elongated record medium thereon and to support said spool for rotation during unwinding of the record medium therefrom, take-up means arranged to receive the record medium, a transducer head disposed along the path of the record medium from the supply spool to the take-up means for coupling to the record medium, a threading member connected to the take-up means and extending along the path of the record medium for detachable connection with the record medium on the supply spool to lead the record medium along said path and onto said take-up means, means comprising a coupling on the end of the record medium and a cooperating coupling on the end of the threading member for providing automatic connection of the threading member with the record medium irrespective of the initial angular orientation of the coupling associated with the supply spool as the spool is initially placed in operative relation on the spindle, means defining a spool receiving well at said spindle for receiving the spool in a direction laterally of the spindle, means whereby the spindle is retracted from the well during insertion of the spool and is thereafter moved axially into the well in driving engagement with the spool, and means whereby the spindle initially presses the spool against a lateral wall of the well whereupon further axial movement of the spindle toward the wall engages the spool on the spindle, and means whereby the spindle is then retracted slightly from the wall to space the spool from the wall for free rotation in said well.

11. In a transducer assembly, a spindle arranged to receive a supply spool having an elongated record medium thereon, take-up means arranged to receive the record medium from the spool, a transducer head disposed along the path of the record medium between the spindle and the take-up means for cooperating with the record medium, a threading member connected to the take-up means and extending along said path toward said spindle for detachable connection with the record medium to lead the record medium along said path and onto said take-up means, drive elements engageable on opposite sides of the record medium to drive the record medium, and means whereby the elements are maintained out of driving relation until the threading member has moved past said elements, and means for automatically engaging said elements after the threading member has traveled therebetween.

12. A single spool magazine comprising a spool having a record medium wound thereon, a coupling secured to the end of the record medium, and means for automatically holding said coupling in a predetermined position each time the record medium is wound onto the spool to facilitate automatic engagement thereof with a threading leader, said means being supported solely by said spool and being symmetrically disposed about the axis of the spool for operation irrespective of the angular position of the coupling about the axis of the spool.

13. A single spool magazine comprising a spool having a record medium wound thereon and a record medium leader of flexible material and of tape configuration connected to the outer end of the record medium and wound in overlying relation to the record medium on said spool, a coupling secured to the end of the record medium leader, and means for automatically holding said coupling in a predetermined position each time the record medium is wound onto the spool to facilitate automatic engagement thereof with a threading leader, said means being supported solely by said spool and being symmetrically disposed about the axis of the spool for operation irrespective of the angular position of the coupling about the axis of the spool, said spool having flanges providing a tape slot of width less than the width of the hub at their periphery and the record medium leader having a width greater than the width of the slot but being sufficiently flexible to be drawn out through said slot.

14. In a single spool magazine machine, means for supporting a single spool magazine at an operating position for rotation in unwinding a record medium therefrom, threading means having a coupling for detachable connection with a coupling on the record medium to lead the record medium along a predetermined path as it is unwound from the magazine, and a guide engageable with said threading means and operative to move the coupling thereof from a first position relatively remote from said operating position to a second position relatively closer to said operating position where said coupling of the threading means is engageable with the coupling of the magazine.

15. A transducer assembly comprising a single spool magazine having a hub and having flanges projecting from opposite axial ends of the hub, said magazine having an elongated member wound on said hub between said flanges, said flanges having means operative to releasably retain the elongated member in wound relation on the hub, means for supporting said magazine for rotation in unwinding the elongated member from the hub and in rewinding the member thereon, and means engageable with the elongated member during rewind thereof onto said hub for automatically pressing said member into engagement with said retaining means.

16. In a single spool magazine machine, means for supporting a single spool magazine at an operating position for rotation in unwinding a record medium therefrom, threading means having a coupling for detachable connection with a coupling on the record medium to lead the record medium along a predetermined path as it is unwound from the magazine, means for rewinding the record medium onto the magazine and for thereby returning the threading means to an initial position, and means for thereafter accommodating rotation of the magazine in the unwinding direction to disengage the coupling on the record medium from the coupling on the threading means.

17. In a single spool magazine machine, means for supporting a single spool magazine at an operating position for rotation in unwinding a record medium therefrom, threading means having a coupling for detachable connection with a coupling on the record medium to lead the record medium along a predetermined path as it is unwound from the magazine and for thereby returning the threading means to an initial position, energy storage means for accumulating energy during rewinding of the record medium onto the magazine and coupled to the magazine supporting means for rotating said magazine in the unwinding direction after rewind to disengage the coupling on the record medium from the coupling on the threading means.

18. A transducer apparatus comprising a single spool magazine machine having means for supporting a single spool magazine for rotation during unwinding of a record medium therefrom, means for mechanically threading the record medium unwound from the magazine in the machine, and mechanical means for supplying a succession of single spool magazines to said supporting means.

19. In a single spool magazine machine, a pre-threaded leader for coupling to a record medium of a single spool magazine on the machine to mechanically thread the record medium, and a holder for retaining the leader out of the path of loading of a magazine onto the machine in one position and movable to a second position to shift the leader radially toward the magazine after the magazine is in operative position on the machine.

20. A single spool magazine for a single spool magazine machine comprising a coil of an elongated record medium having a leader at its outer end for coupling to a pre-threaded leader of the machine for mechanical threading of the record medium in the machine and a second leader connected to the inner end of the record medium and having means for controlling reversal of the direction of movement of the record medium in the single spool magazine machine.

21. In a single spool magazine assembly, a single spool magazine having a record medium wound thereon and having a coupling secured to the end of the record medium, means for retaining the coupling in a predetermined orientation at any of a plurality of positions about the circumference of said magazine, means for mounting the magazine for rotation on a central axis to accommodate unwinding of the record medium therefrom and rewinding of the record medium onto the magazine, take-up means for receiving the record medium from the magazine, transducer means for transducing cooperation with the record medium as it travels along a path from the magazine to the take-up means, a threading member connected to the take-up means and extending along said path toward the magazine for detachable connection with the coupling on the record medium to lead the record medium along said path and onto said take-up means, means for positioning said threading member for connection with the coupling on the record medium, and means for rotating the magazine in the rewinding direction to move the coupling on the record medium into coupling engagement with said threading member.

22. In a transducer assembly, a holder having an interior axially extended space for receiving a stack of single spool magazines and having an opening at one end of said space for passage of said magazines in an axial direction out of said holder, means for coupling the holder to a single spool magazine machine, and means at said one end of said cylindrical space operable in a retaining position thereof for retaining said stack of magazines in said space and operable in a releasing position thereof for releasing said magazines for movement along the axis of said cylindrical space and through said opening to the exterior of said holder.

23. A single spool magazine machine having means for supporting a single spool magazine during unwinding of a record medium therefrom and during rewinding of the record medium into the magazine, a pre-threaded leader for coupling with the record medium of the magazine, and means for rotating the magazine on said supporting means in the rewinding direction for coupling of the record medium of the magazine with said pre-threaded leader.

24. A single spool magazine machine having means for supporting a single spool magazine during unwinding of a record medium therefrom and during rewinding of the record medium onto the magazine, a pre-threaded leader for coupling with the record medium of a magazine on said supporting means, take-up means connected to the leader for receiving the leader and the record medium during unwinding of the record medium from the magazine on the supporting means and for discharging the record medium therefrom as it is rewound onto the magazine, and means responsive to rewinding of the record medium onto the magazine for automatically momentarily rotating said magazine on said supporting means in the unwinding direction to uncouple said record medium from said leader.

25. In a single spool magazine machine having means for rotatably supporting a single spool magazine, means for mechanically threading the record medium as it is unwound from a magazine on said rotatably supporting means, and means for moving said rotatably supporting means to automatically couple the mechanically threading means with the record medium on said magazine.

26. In a single spool record magazine, spool means having a longitudinally elongated record medium wound thereon and terminating in an outer convolution of tape configuration, coupling means secured to said outer convolution and comprising an engagement element, and means on said spool means securely holding said coupling means in a fixed automatic coupling orientation relative to said spool means with said engaging element projecting radially outwardly beyond said outer convolution on said spool means and opening for engagement with a cooperating coupling in a circumferential direction with respect to said spool means.

27. In a transducer assembly, a spool having an elongated record medium wound thereon as a series of convolutions and having an outer convolution of tape configuration connected with an overlying said series of convolutions and terminating in a free end, said spool having having retaining means for retaining the outer convolution within the confines of said spool and for preventing inadvertent unwinding thereof from the spool during handling of the spool, a transducing machine having means for mounting said spool for rotation in unwinding of said record medium therefrom and in rewinding of said record medium thereon and having means for moving said record medium along a transducing path of said transducing machine as it is unwound from said spool on said mounting means, and automatic threading means for automatically disengaging said outer convolution from said retaining means and for mechanically threading said record medium along said transducing path comprising a member having an end portion for engagement with the free end of said outer convolution on said spool for disengaging said outer convolution from said retaining means, and means for rotating said spool on said mounting means to move the end portion of said member into engagement with the free end of said outer convolution to initiate automatic threading of the record medium along said transducing path.

28. A single spool magazine comprising a spool having a central hub and spaced annular flange means extending from said hub, an elongated record medium of tape configuration wound on said hub between said flange means, said record medium having a leader portion of flexible material at the outer end thereof and wound on top of the record medium, said leader portion being of width substantially greater than the width dimension of said record medium, said spool having retaining means for retaining said leader portion in wound relation on said spool and for preventing inadvertent unwinding of the record medium from the spool during handling thereof, said flange means together with said retaining means thereon having a minimum spacing therebetween radially outwardly of the leader portion substantially equal to the width dimension of said record medium but being less than the width of said leader portion for requiring flexure of said leader portion in order to unwind the same from said spool while providing for unwinding of the record medium from the spool without requiring flexure along the width dimension of the record medium itself, said flange means and the retaining means thereon at the portion thereof having said minimum spacing serving to guide said record medium as it is wound onto said hub to provide uniform even winding of the record medium on said hub.

29. In a transducer assembly, a single spool magazine comprising a spool having a central hub and spaced flange means extending from said hub, an elongated record medium wound on said hub between said flange means as a series of convolutions and having an outer convolution of tape configuration terminating in a free end, retaining means for retaining said outer convolution in wound relation on said spool and for preventing inadvertent unwinding thereof from said spool during handling of said spool, and a transducer machine having means for mounting said spool for rotation in unwinding of said record medium therefrom and in rewinding of said record medium thereon and having means for moving said record medium along a transducing path of said transducing machine as it is unwound from said spool, and automatic threading means on said machine for automatically mechanically disengaging said outer convolution from said spool and for mechanically threading said record medium along said transducing path.

30. The assembly of claim 6 further comprising means responsive to connection of the threading member with the record medium to actuate said take-up means.

31. The assembly of claim 29 further comprising means for rotating said spool on said mounting means to bring the free end of said outer convolution into engagement with said automatic threading means, and means for preventing operation of said moving means unless the free end of the outer convolution is in engagement with said automatic threading means.

References Cited in the file of this patent

UNITED STATES PATENTS

| | | |
|---|---|---|
| 1,253,372 | Gotti | Jan. 15, 1918 |
| 1,973,457 | Wittel | Sept. 11, 1934 |
| 2,321,812 | Heller | June 15, 1943 |
| 2,529,501 | Johnston | Nov. 14, 1950 |
| 2,539,676 | Sontag et al. | Jan. 30, 1951 |
| 2,668,059 | Roberts | Feb. 2, 1954 |
| 2,679,362 | Thalhammer | May 25, 1954 |